(12) United States Patent
Korzunov

(10) Patent No.: US 9,934,757 B2
(45) Date of Patent: Apr. 3, 2018

(54) METHOD AND SYSTEM OF DOWNLOADING IMAGE TILES ONTO A CLIENT DEVICE

(71) Applicant: YANDEX EUROPE AG, Lucerne (CH)

(72) Inventor: Anton Vasilyevich Korzunov, Podolsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/460,996

(22) Filed: Mar. 16, 2017

(65) Prior Publication Data

US 2017/0287437 A1   Oct. 5, 2017

(30) Foreign Application Priority Data

Apr. 4, 2016 (RU) ................................ 2016112612

(51) Int. Cl.
*G09G 5/00* (2006.01)
*G06T 3/40* (2006.01)

(52) U.S. Cl.
CPC ............... *G09G 5/006* (2013.01); *G06T 3/40* (2013.01); *G09G 2370/022* (2013.01)

(58) Field of Classification Search
None
See application file for complete search history.

(56) References Cited

U.S. PATENT DOCUMENTS

| 7,872,650 B2 | 1/2011 | Fay |
| 8,274,524 B1 | 9/2012 | Cornell et al. |
| 8,352,480 B2 | 1/2013 | Iwuchukwu |
| 8,988,468 B2 | 3/2015 | Cheung et al. |

(Continued)

FOREIGN PATENT DOCUMENTS

| RU | 2345418 C2 | 1/2009 |
| RU | 2558615 C2 | 8/2015 |

OTHER PUBLICATIONS

Hill, An Efficient, Hardware-Accelerated, Level-of-Detail Rendering Technique for Large Terrains, a thesis submitted in conformity with the requirements for the degree of Master's of Science Graduate Department of Computer Science, University of Toronto, Copyright by David Hill 2002, 109 pages.

(Continued)

*Primary Examiner* — Michelle Chin
(74) *Attorney, Agent, or Firm* — BCF LLP

(57) ABSTRACT

There is disclosed a method for downloading image tile data from a server to a client device, the data being organized, by the server, in a hierarchal structure, where each level of the hierarchal structure stores a subset of image tiles associated with a particular resolution level. The method comprises, where the client device requests a new image view of a larger resolution, determining an anchor point of the first image view; based on the anchor point, determining a first anchor image tile of the first-level image tiles; using the hierarchical structure, determining a corresponding four child second-level image tiles, the corresponding four-child second-level image tiles forming a second anchor image tile; sending to the client device the second anchor image tile, the sending causing the client device to: replace, in the memory and on the output device, the first anchor image tile with the second anchor image tile.

20 Claims, 10 Drawing Sheets

(56) References Cited

U.S. PATENT DOCUMENTS

| | | |
|---|---|---|
| 2005/0270311 A1 | 12/2005 | Rasmussen et al. |
| 2010/0321399 A1 | 12/2010 | Ellren et al. |
| 2011/0055290 A1 | 3/2011 | Li et al. |
| 2012/0117112 A1 | 5/2012 | Johnston et al. |
| 2012/0158762 A1 | 6/2012 | Iwuchukwu |
| 2015/0170396 A1 | 6/2015 | Kornmann |
| 2015/0279071 A1 | 10/2015 | Xin |
| 2016/0033295 A1 | 2/2016 | Li et al. |

OTHER PUBLICATIONS

U.S. Appl. No. 15/460,980, filed Mar. 16, 2017.

METHOD AND SYSTEM OF DOWNLOADING IMAGE TILES ONTO A CLIENT DEVICE

CROSS-REFERENCE

The present application claims priority to Russian Patent Application No. 2016112612, filed Apr. 4, 2016, entitled "METHOD AND SYSTEM OF DOWNLOADING IMAGE TILES ONTO A CLIENT DEVICE", the entirety of which is incorporated herein by reference.

FIELD OF THE TECHNOLOGY

The present technology relates to method and system for downloading image tiles onto a client device.

BACKGROUND

A typical user of electronic devices can access a plethora of information (such as information available on the various resources hosted on various servers and accessible via Internet or via other communication means). Some of the information so accessed includes various images. Various images may include captured photos, various generated images, as well as spatial data (such like maps, plans and the like), as well as videos and 3D games.

Some of the images can be quite large (such as maps, for example). It is also customary to store such image data on a server and download it to a client device, upon request. For example, the image data can be downloaded to the client device in response to a user of the client device requesting an image view associated with a portion or an entirety of the images (for example, by loading an application, by loading a browser and accessing a resource associated with the image or the like).

Some of the files containing image data can be so large that it may be impractical to apriori download the entirety of the image data file to the client device. For example, this may put an unnecessary strain on the communication network that the client device is connected to for accessing the resource associated with the image data. One can appreciate that in case of the client device being a wireless communication device coupled to a wireless communication network in a remote location, the problem can be also further exacerbated by slow or otherwise inadequate network speed or throughput. This can also be impractical due to the local memory limitations (for example, when the image needs to be stored in the client device cache for rendering thereof and the client device cache has capacity limitations).

This problem is particularly dire in cases where image data is associated with a map. Since a typical user typically requests a particular view of the map (called "viewport") at a particular zoom level—there is no practical reason (and, actually, may be even impossible) to download the entirety of the map data representing an entire world view. Hence, it is a common solution to download image data associated with a map (or any other type of image information) split in so-called "map tiles" or simply "tiles". Each map tile typically represents a portion of the map image at a particular zoom level. A sub-set of map tiles is downloaded to the client device (based on the requested viewport and the zoom level), which sub-set of map tiles is then rendered and displayed on an output device associated with the client device.

It is also typical for the user of the client device to request the map view at a different zoom levels—so called zooming-in and zooming-out. To see a particular portion of the map in more details, the user may need to zoom in—in order to see a smaller fragment of the map in more details (and/or at a higher resolution). As a result of such action of the user, the client device requests form the server and the server transmits to the client device a replacement set of map tiles (for the new viewport/the new zoom level) for rendering the new requested map view (to replace the originally-rendered and displayed map view). To see a particular portion of the map in smaller detail (but cover a larger area), the user may need to zoom out—in order to see a larger fragment of the map albeit with fewer details (and/or at a higher resolution). As a result of such action of the user, the client device requests form the server and the server transmits to the client device a replacement set of map tiles (for the new viewport/the new zoom level) for rendering the new requested map view (to replace the originally-rendered and displayed map view).

US patent application 2011/0055290 discloses system for provisioning a geographical image for retrieval, comprising: an application server operating to receive a query for a geographical region in a geographical area of coverage; and a database server operating to store a plurality of geo-image tiles that cover the geographical area of coverage at different zoom levels, the database server is coupled to the application server to receive the query from the application server and return one or more of the plurality of geo-image tiles to illustrate the geographical region requested in the query; wherein the plurality of geo-image tiles are partitioned for storage in the database server in accordance with a database management system (DBMS) scheme and indexed or retrieval with a non-spatial index.

U.S. Pat. No. 8,352,480 teaches an apparatus for converting geographical geometrical content of a geographical database to map tiles may include a processor and a memory storing executable computer code that cause the apparatus to at least perform operations including modifying a geographical database based in part on adding items of data arranged in fields based on analyzing values corresponding to geometry information. The geometry information is associated with records of the geographical database. The computer program code may further cause the apparatus to determine a set of tiles at a predetermined zoom level including geographical information of respective records and may update the records to include data associated with minimum and maximum x and y values of the tiles. The computer program code may further cause the apparatus to determine minimum and maximum x and y values that define a rectangular block(s) of map tiles. Corresponding computer program products and methods are also provided.

US Patent application 2015/0279071 discloses a computerized method of managing a collaboration space. The disclosed method comprises partitioning the collaboration space into a plurality of tiles in a tree structure; and associating each graphic object with a tile in the tree structure; the tile being the smallest tile in the tree structure that substantially accommodate the graphic object.

SUMMARY

Embodiments of the present technology have been developed based on inventors' appreciation of at least one technical problem associated with the prior art solutions. More specifically, with the resolution of device screens increasing every year, the size of files containing map tile data tiles increases as well.

Within wishing to be bound by any specific theory, developers believe that certain technical problems of the prior art solution stem from the fact that depending on the connection speed of the associated communication network and on processing power of the client device, the process of transmitting tiles of a new level and replacing tiles of the present level with tiles of the new level can take considerable time ("considerable" being in the sense of being noticed/appreciated by the user). During this time, the user may see portions of the map view in "white blocks" (or otherwise in a distorted manner).

Furthermore, it is customary to store the image tiles in the cache memory of the client device. This is done to enable rapid rendering and displaying of the generated image. Prior art approaches further contemplate keeping image tiles associated with a previous image view until all image tiles of a new view are downloaded to the client device, at which point the image tiles associated with the previous image tiles are deleted. As has been alluded to above, with the increase in resolution of output devices, there is a corresponding increase in the size of the files containing image tiles to be displayed. Thus, developers believe that the prior art approach of "download-store entirety of new image tiles—delete old image tiles" can be very resource-consuming or even lead to cache over-filling. This, in turn, can result in a decreased performance of the rendering engine (i.e. lower speed of rendering), unnecessary drain on the batter of the electronic device (due to the cache overfill, etc) and the like.

According to a first broad aspect of the present technology, there is provided a method of downloading image tiles onto a client device, the client device having an output device and being connectable to a sever via a communication network. The server stores a plurality of image tiles organized in a hierarchical structure, each level of the hierarchical structure storing a sub-set of the plurality of image tiles being associated with a particular resolution level. The method is executable at the client device. The method comprises: receiving a request for an image view, the image view being associated with a first viewport and a first resolution level; transmitting, to the server, a first request for a first set of image tiles, the first set of image tiles for enabling the client device to display a requested image view on the output device, the first set of image tiles being part of a plurality of image ties of the first resolution level; the first request being further configured to cause the server to prepare a second set of image tiles, the second set of image tiles for enabling the client device to display a different image view, which is: associated with a second viewport at least partially overlapping with the first viewport; and having a second resolution level being lower than the first resolution level; each given image tile of the second set of image tiles having four child image tiles in the plurality of image tiles of the first resolution level as prescribed by the hierarchical structure; receiving, from the server: the first set of image tiles; the second set of image tiles, the second set of image tiles excluding a subset of second set of image tiles each one of the subset of second set having all four child image tiles in the first set of image tiles; receiving a request to change the first viewport to a third viewport; rendering and displaying a transition view, the transition view made up of the second set of image tiles and the respective child image tiles in lieu of the subset of second set of image tiles; transmitting, to the server, a third request for a map tiles native to the third viewport required for displaying the third viewport; rendering the third viewport using the map tiles native to the third viewport; replacing the transition view with the third viewport.

In some implementations of the method, the transmitting the first request is executed before the receiving the request to change the first viewport to the second viewport.

In some implementations of the method, the transition view is displayed while executing the transmitting the third request and the rendering the different image view.

In some implementations of the method, the first request being further configured to cause the server to prepare: a third set of image tiles, the third set of image tiles for enabling the client device to display a further image view, the further image view being associated with a fourth viewport at least partially overlapping with the first viewport and the second viewport; and having a third resolution level being lower than the first resolution level and the second resolution level; the third set of image tiles being part of a plurality of image tiles of the third resolution level; each given image tile of the third set of image tiles having four child image tiles in the plurality of image tiles of the second resolution level as prescribed by the hierarchical structure; and wherein the receiving, from the server further comprises receiving the third set of image tiles, the third set of image tiles excluding a subset of third set of image tiles each one of the subset of third set of image tiles having all four child image tiles in the second set of image tiles; in response to the request to change the first viewport to the further image view: rendering and displaying another transition view, the other transition view made up of the third set of image tiles and the respective child image tiles in lieu of the subset of third set of image tiles; transmitting, to the server, a fourth request for a map tiles native to the fourth viewport required for displaying the fourth viewport; rendering another transition view, the other transition view made up of the third set of image tiles and the respective child image tiles in lieu of the subset of third set of image tiles; transmitting, to the server, a fourth request for a complete fourth set of image tiles; rendering the further image view using the complete fourth set of image tiles; replacing the other transition view with the further image view.

In some implementations of the method, the method further comprises, in response to the request to change the first viewport to the further image view, ceasing executing one of: transmitting, to the server, a third request for a complete second set of image tiles; rendering the different image view using the complete second set of image tiles; replacing the transition view with the different image view, which execution has not yet completed.

In some implementations of the method, the hierarchical structure is a quad tree data structure.

In some implementations of the method, the image tiles comprise map tiles and the resolution level parameter comprises a zoom level.

In some implementations of the method, the image tiles comprise game textures and the resolution level parameter comprises a detailing level.

In accordance with another broad aspect of the present technology, there is provided an electronic device. The electronic device comprises: a processor; an output device for displaying at least one image; a communication interface for communicating to a sever via a communication network, the server storing a plurality of image tiles organized in a hierarchical structure, each level of the hierarchical structure storing a sub-set of the plurality of image tiles being associated with a particular resolution level. The processor being configured to: receive a request for an image view, the image view being associated with a first viewport and a first resolution level; transmit, to the server, a first request for a first set of image tiles, the first set of image tiles for enabling the client device to display a requested image view on the output device, the first set of image tiles being part of a plurality of image ties of the first resolution level; the first request being further configured to cause the server to prepare a second set of image tiles, the second set of image tiles for enabling the client device to display a different image view, which is: associated with a second viewport at least partially overlapping with the first viewport; and having a second resolution level being lower than the first resolution level; each given image tile of the second set of image tiles having four child image tiles in the plurality of image tiles of the first resolution level as prescribed by the hierarchical structure; receive, from the server: the first set of image tiles; the second set of image tiles, the second set of image tiles excluding a subset of second set of image tiles each one of the subset of second set having all four child image tiles in the first set of image tiles; receive a request to change the first viewport to a third viewport; render and displaying a transition view, the transition view made up of the second set of image tiles and the respective child image tiles in lieu of the subset of second set of image tiles; transmit, to the server, a third request for a map tiles native to the third viewport required for displaying the third viewport; render the third viewport using the map tiles native to the third viewport; replace the transition view with the third viewport.

In some embodiments of the electronic device, the processor executes transmitting the first request before the processor receives the request to change the first viewport to the second viewport.

In some embodiments of the electronic device, the transition view is displayed while executing the transmitting the third request and the rendering the different image view.

In some embodiments of the electronic device, the first request being further configured to cause the server to prepare: a third set of image tiles, the third set of image tiles for enabling the client device to display a further image view, the further image view being associated with a fourth viewport at least partially overlapping with the first viewport and the second viewport; and having a third resolution level being lower than the first resolution level and the second resolution level; the third set of image tiles being part of a plurality of image tiles of the third resolution level; each given image tile of the third set of image tiles having four child image tiles in the plurality of image tiles of the second resolution level as prescribed by the hierarchical structure; and wherein the receiving, from the server further comprises receiving the third set of image tiles, the third set of image tiles excluding a subset of third set of image tiles each one of the subset of third set of image tiles having all four child image tiles in the second set of image tiles; in response to the request to change the first viewport to the further image view, the processor is further operable to: render and display another transition view, the other transition view made up of the third set of image tiles and the respective child image tiles in lieu of the subset of third set of image tiles; transmit, to the server, a fourth request for a map tiles native to the fourth viewport required for displaying the fourth viewport; render another transition view, the other transition view made up of the third set of image tiles and the respective child image tiles in lieu of the subset of third set of image tiles; transmit, to the server, a fourth request for a complete fourth set of image tiles; render the further image view using the complete fourth set of image tiles; replace the other transition view with the further image view.

In some embodiments of the electronic device, the processor is further operable to, in response to the request to change the first viewport to the further image view, cease executing one of: transmitting, to the server, a third request for a complete second set of image tiles; rendering the different image view using the complete second set of image tiles; replacing the transition view with the different image view, which execution has not yet completed.

In some embodiments of the electronic device, the hierarchical structure is a quad tree data structure.

In some embodiments of the electronic device, the image tiles comprise map tiles and the resolution level parameter comprises a zoom level.

In some embodiments of the electronic device, the image tiles comprise game textures and the resolution level parameter comprises a detailing level.

In accordance with yet another broad aspect of the present technology, there is provided a method for downloading image tile data from a server to a client device. The image tile data is organized, by the server, in a hierarchal structure, where each level of the hierarchal structure stores a subset of image tiles associated with a particular resolution level. The client device including a memory and an output device, the client device being connectable to the server via a communication network, the output device displaying a first image view, the first image view being associated with a first viewport and a first resolution level, the first image view being generated using a portion of the plurality of the first-level image tiles associated with the first resolution level, the portion being determined by the first viewport; the portion of the plurality of the first-level image tiles having been (i) downloaded by the client device from the server and (ii) stored by the client device in the memory to enable rendering thereof. The method is executable by the server. The method comprises: receiving, from the client device, a request for a plurality of second-level image tiles to replace the plurality of first-level image tiles to display a second image view, the second image view being associated with a second view port and a second resolution level, the second resolution level being larger than the first resolution level; each image tile of the plurality of first-level image tiles having four child second-level image tiles within the plurality of second-level image tiles as defined by the hierarchal structure; determining an anchor point of the first image view; based on the anchor point, determining a first anchor image tile of the first-level image tiles; using the hierarchical structure, determining a corresponding four child second-level image tiles, the corresponding four-child second-level image tiles forming a second anchor image tile; sending to the client device the second anchor image tile, the sending configured to cause the client device to: replace, in the memory, the first anchor image tile with the second anchor image tile; replace, on the output device, the first anchor image tile with the second anchor image tile.

In some embodiments of the method, the method further comprises, after the sending to the client device the second anchor image tile: determining a first adjacent image tile of the first-level image tiles, the first adjacent image tile being adjacent to the first anchor image tile of the first-level image tiles; using the hierarchical structure, determining a corresponding four child second-level image tiles for the first adjacent image tile, the corresponding four-child second-level image tiles forming a second adjacent image tile; sending to the client device the second adjacent image tile, the sending configured to cause the client device to: replace, in the memory, the first adjacent image tile with the second adjacent image tile; replace, on the output device, the first adjacent image tile with the second adjacent image tile.

In some embodiments of the method, the method further comprises, after the sending to the client device the second adjacent image tile: determining a third adjacent image tile of the first-level image tiles, the third adjacent image tile being adjacent to the first anchor image tile of the first-level image tiles; using the hierarchical structure, determining a corresponding four child second-level image tiles for the third adjacent image tile, the corresponding four-child second-level image tiles forming a fourth adjacent image tile; sending to the client device the fourth adjacent image tile, the sending configured to cause the client device to: replace, in the memory, the third adjacent image tile with the fourth adjacent image tile; replace, on the output device, the third adjacent image tile with the fourth adjacent image tile.

In some embodiments of the method, the determining the anchor point of the first image view comprises receiving an indication of the anchor point from the client device.

In some embodiments of the method, the indication of the anchor point corresponds to a center-point of the first viewport.

In some embodiments of the method, the indication of the anchor point corresponds to a cursor position over the first viewport.

In some embodiments of the method, the hierarchical structure is a quad tree data structure.

In some embodiments of the method, the image tiles comprise map tiles and the resolution level comprises a zoom level.

In some embodiments of the method, wherein the image tiles comprise game textures and the resolution level comprises a detailing level.

In some embodiments of the method, the sending to the client device the second anchor image tile further comprises sending an instruction, the instruction to cause the client device to: replace, in the memory, the first anchor image tile with the second anchor image tile; replace, on the output device, the first anchor image tile with the second anchor image tile.

In some embodiments of the method, the sending to the client device the second anchor image causes the client device to: replace, in the memory, the first anchor image tile with the second anchor image tile; replace, on the output device, the first anchor image tile with the second anchor image tile; the steps of replacing being executed based on computer-executable instructions stored by the client device.

In some embodiments of the method, the memory comprises a cache memory.

In some embodiments of the method, the sending to the client device the second anchor image tile is further configured to cause the client device to: render the second anchor image tile.

In accordance with yet another broad aspect of the present technology, there is provided a server. The server comprises: a processor; a memory storage coupled to the processor, the memory storage for storing image tile data; the image tile data being organized, by the server, in a hierarchal structure, where each level of the hierarchal structure stores a subset of image tiles associated with a particular resolution level; a communication interface for allowing the server be connectable to a client device via a communication network, the client device including a memory and an output device, the output device displaying a first image view, the first image view being associated with a first viewport and a first resolution level, the first image view being generated using a portion of the plurality of the first-level image tiles associated with the first resolution level, the portion being determined by the first viewport; the portion of the plurality of the first-level image tiles having been (i) downloaded by the client device from the server and (ii) stored by the client device in the memory to enable rendering thereof. The processor is configured to: receive, from the client device, a request for a plurality of second-level image tiles to replace the plurality of first-level image tiles to display a second image view, the second image view being associated with a second view port and a second resolution level, the second resolution level being larger than the first resolution level; each image tile of the plurality of first-level image tiles having four child second-level image tiles within the plurality of second-level image tiles as defined by the hierarchal structure; determine an anchor point of the first image view; based on the anchor point, determine a first anchor image tile of the first-level image tiles; using the hierarchical structure, determine a corresponding four child second-level image tiles, the corresponding four-child second-level image tiles forming a second anchor image tile; send to the client device the second anchor image tile, the sending configured to cause the client device to: replace, in the memory, the first anchor image tile with the second anchor image tile; replace, on the output device, the first anchor image tile with the second anchor image tile.

In some implementations of the server, the processor being further configured, after the sending to the client device the second anchor image tile, to: determine a first adjacent image tile of the first-level image tiles, the first adjacent image tile being adjacent to the first anchor image tile of the first-level image tiles; using the hierarchical structure, determine a corresponding four child second-level image tiles for the first adjacent image tile, the corresponding four-child second-level image tiles forming a second adjacent image tile; send to the client device the second adjacent image tile, the sending configured to cause the client device to: replace, in the memory, the first adjacent image tile with the second adjacent image tile; replace, on the output device, the first adjacent image tile with the second adjacent image tile.

In some implementations of the server, the processor being further configured, after the sending to the client device the second adjacent image tile, to: determine a third adjacent image tile of the first-level image tiles, the third adjacent image tile being adjacent to the first anchor image tile of the first-level image tiles; using the hierarchical structure, determine a corresponding four child second-level image tiles for the third adjacent image tile, the corresponding four-child second-level image tiles forming a fourth adjacent image tile; send to the client device the fourth adjacent image tile, the sending configured to cause the client device to: replace, in the memory, the third adjacent image tile with the fourth adjacent image tile; replace, on the output device, the third adjacent image tile with the fourth adjacent image tile.

In some implementations of the server, to determine the anchor point of the first image view, the processor is configured to receive an indication of the anchor point from the client device.

In some implementations of the server, the indication of the anchor point corresponds to a center-point of the first viewport.

In some implementations of the server, the indication of the anchor point corresponds to a cursor position over the first viewport.

In some implementations of the server, hierarchical structure is a quad tree data structure.

In some implementations of the server, the image tiles comprise map tiles and the resolution level comprises a zoom level.

In some implementations of the server, the image tiles comprise game textures and the resolution level comprises a detailing level.

In some implementations of the server, to send to the client device the second anchor image tile, the processor is configured to send an instruction, the instruction to cause the client device to: replace, in the memory, the first anchor image tile with the second anchor image tile; replace, on the output device, the first anchor image tile with the second anchor image tile.

In some implementations of the server, the sending to the client device the second anchor image causes the client device to: replace, in the memory, the first anchor image tile with the second anchor image tile; replace, on the output device, the first anchor image tile with the second anchor image tile; the steps of replacing being executed based on computer-executable instructions stored by the client device.

In some implementations of the server, the memory comprises a cache memory.

In some implementations of the server, sending to the client device the second anchor image tile is further configured to cause the client device to: render the second anchor image tile.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever, comprising information capable of being stored in a database. Thus information includes, but is not limited to data (map data, location data, coordinates, numerical data, etc.), text (opinions, comments, questions, messages, etc.), documents, spreadsheets, etc.

In the context of the present specification, unless specifically provided otherwise, the word "component" is meant to include software (appropriate to a particular hardware context) that is both necessary and sufficient to achieve the specific function(s) being referenced.

In the context of the present specification, unless specifically provided otherwise, the expression "information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first surface" and "third surface" is not intended to imply any particular order, type, chronology, hierarchy or ranking (for example) of/between the surfaces, nor is their use (by itself) intended imply that any "second surface" must necessarily exist in any given situation. Further, as is discussed herein in other contexts, reference to a "first" element and a "second" element does not preclude the two elements from being the same actual real-world element. Thus, for example, in some instances, a "first" element and a "second" element may be the same element, in other cases they may be different elements.

In the context of the present specification, unless specifically provided otherwise, the words "lower zoom level", "higher zoom level", "lower resolution level" and "higher resolution level" are used to denote the following. Lower zoom level/lower resolution level is a level that is lower than a current one—for example, if current zoom level is 100%, the zoom level of 75% is considered to be the lower zoom level. Conversely, higher zoom level/higher resolution level is a level that is higher than a current one—for example, if current zoom level is 75%, zoom level of 100% is considered to be the higher zoom level. Generally speaking, lower zoom level/lower resolution level is characterized by fewer details being shown to the user when the image is rendered and displayed (thus, requiring less memory to store image tiles covering this particular zoom level/resolution level). On the other hand, higher zoom level/resolution level is characterized by either one or both of more details and details of greater quality (and, thus, requiring more memory to store image tiles covering this zoom level/resolution level).

In the context of the present specification, unless specifically provided otherwise, "hierarchical organization of image tiles", "hierarchical structure for organizing image tiles" or simply "hierarchical structure" are used to denote organization of a memory where image information is stored. The hierarchical organization can be (but is not limited to) a tree structure, in which each level of the tree structure stored image tiles corresponding to a particular zoom level/resolution level. Within the hierarchical structure each image tile of a given zoom level/resolution level has 4 (four) child tiles associated with the next higher zoom level/resolution level. Thus, when the zoom level/resolution level is changed from a lower level to a higher level, a given image tile of the lower level (i.e. image tiles used for rendering and displaying a current image view) is replaced by its associated four child tiles of the higher zoom level/resolution level.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
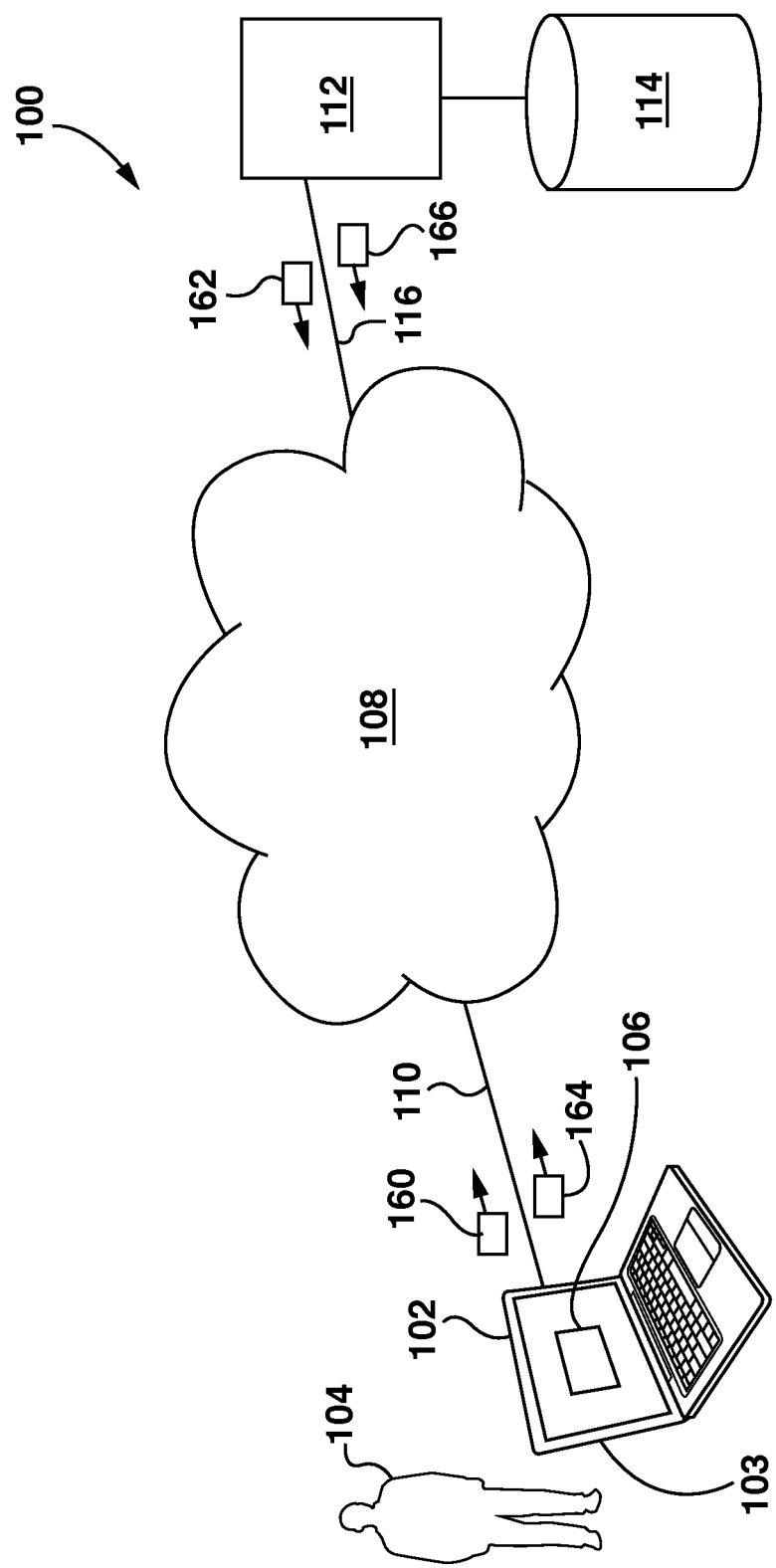
FIG. 1 is a schematic diagram of a system, the system being implemented in accordance with a non-limiting embodiment of the present technology.

Referring to FIG. 1, there is shown a schematic diagram of a system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an client device 102. The client device 102 is typically associated with a user 104 and, as such, can be referred herein below as a client device 102. It should be noted that the fact that the client device 102 is associated with the user 104 does not need to suggest or imply any mode of operation, such as a need to log in, a need to be registered or the like.

The implementation of the client device 102 is not particularly limited, but as an example, the client device 102 may be implemented as a personal computer (desktop (as shown), laptop, netbook, etc.), and a wireless communication device (a cell phone, a smartphone, a tablet and the like). The client device 102 comprises several hardware components, including but not limited to a processor (not depicted) and a memory (not depicted), which memory can have several components (including cache and the like).

The client device 102 comprises hardware and software and/or firmware (or a combination thereof) for executing an image application 106 (such as a browser application, an image viewing application, a mapping application and the like), the image application 106 for inter alia displaying a user interface, such as an interface of a browser application which can be used for accessing or otherwise displaying an image.

The image application 106 can be, but not limited to, a dedicated mapping application, such as the Yandex.Maps™ application for mobile devices, a web browser, or any other application providing a map image. In a particular embodiment of the present technology, the user interface can be implemented on a web page that is not otherwise dedicated to maps (such as, for example, a web site of general interest, such as a bank web site, a restaurant web site and the like). The image application 106 can also be implemented as an image capturing/editing application, as a 3D game application and the like. Broadly speaking, the image application 106 is configured to render and cause display of one or more images.

The client device 102 is coupled to a communication network 108 via a communication link 110. In some non-limiting embodiments of the present technology, the communication network 108 can be implemented as the Internet. In other embodiments of the present technology, the communication network 108 can be implemented differently, such as any wide-area communication network, local-area communication network, a private communication network and the like.

How the communication link 110 is implemented is not particularly limited and will depend on how the client device 102 is implemented. Merely as an example and not as a limitation, in those embodiments of the present technology where the client device 102 is implemented as a wireless communication device (such as a smart-phone), the communication link 110 can be implemented as a wireless communication link (such as but not limited to, a 3G communication network link, a 4G communication network link, a Wireless Fidelity, or WiFi® for short, Bluetooth® and the like). In those examples, where the client device 102 is implemented as a notebook computer, the communication link can be either wireless (such as WiFi®, Bluetooth® or the like) or wired (such as an Ethernet based connection).

General implementation of the client device 102 is known. It should, however, be mentioned that the client device 102 comprises an output device 103. The output device 103 is configured to present visual information to the user 104. The visual information can be text, images, videos and the like. In particular, the output device 103 is configured to display output of the image application 106. The output device 103 can be implemented as a monitor, a built-in display, a touch screen and the like.

It should be expressly understood that implementations for the client device 102, the communication link 110 and the communication network 108 are provided for illustration purposes only. As such, those skilled in the art will easily appreciate other specific implementational details for the client device 102, the communication link 110 and the communication network 108. As such, by no means, examples provided herein above are meant to limit the scope of the present technology.

Also coupled to the communication network is an image server 112. The image server 112 can be implemented as a conventional computer server. In an example of an embodiment of the present technology, the image server 112 can be implemented as a Dell™ PowerEdge™ Server running the Microsoft™ Windows Server™ operating system. It is contemplated that the image server 112 can be implemented in any other suitable hardware and/or software and/or firmware or a combination thereof. In the depicted non-limiting embodiment of present technology, the image server 112 is a single server. In alternative non-limiting embodiments of the present technology, the functionality of the image server 112 may be distributed and may be implemented via multiple servers.

The implementation of the image server 112 is well known to the person skilled in the art of the present technology. However, briefly speaking, the image server 112 comprises a communication interface (not depicted) structured and configured to communicate with various entities (such as the client device 102, for example) via the communication network 108. The image server 112 further comprises at least one computer processor (not depicted) operationally connected with the communication interface and structured and configured to execute various processes to be described herein.

The image server 112 is coupled to the communication network 108 via a communication link 116. How the communication link 116 is implemented is not particularly limited and will depend on how the image server 112 is implemented. It is contemplated that the examples of implementations of the communication link 110 provided above could be applied to the communication link 116.

The image server 112 has access to an image database 114. The image database 114 is configured to store image data required to render one or more images. How the image database 114 maintains image data will be described in greater detail herein below. As will be discussed below, the image server 112 is configured to: receive, via the communication network 108 and communication links 110, 116, from the client device 102 a request for an image view; (ii) to retrieve image data (such as one or more image tiles) required for generating the requested image view from the image database 114 and (iii) to send the retrieved image data to the client device 102, via the communication network 108 and communication links 110, 116.

It should be understood that the nature of the image (and therefore the image data) that is stored by the image server 112 is not particularly limited. In some embodiments of the present technology, the image is a map and the image data is a plurality of map tiles, a given sub-set of map tiles for rendering a particular map view at a particular zoom level. In alternative embodiments, the image is another type of an image (such as part of a 3D game, for example) and the image data is game textures, a given game texture for generating a particular game view at a particular resolution level. Naturally, the image and the image data can be implemented in several different ways.

Implementations of the image database 114 can be of any nature and kind known in the art. How the image database 114 is implemented is not particularly limited. The particular implementation of the image database 114 can be determined by the characteristics of the stored data. The data storage format can also be determined by the characteristics of the stored data. For example, the YMapsML format can be used as the data storage format. In alternative implementations, the GML format—Geographic Markup Language—can be used as the data storage format. GML is developed and maintained by the OGC (Open Geospatial Consortium) and is an international ISO standard.

The remainder of the description to be presented herein below will use a map image, map viewport, map resolution level, map data and map tiles as examples for how to implement embodiments of the present technology. However, it is expected that the reader, having appreciated teachings presented herein, will be able to apply same mutatis mutandis to other types of images, image data and image tiles. For example, the teachings to be presented herein below can apply mutatis mutandis to the image being a 3Dgame, game textures and detailing levels.

In accordance with the embodiments of the present technology, once the client device 102 receives the map section (i.e. map data containing map tiles for rendering a particular map view having a particular viewport and a particular zoom level), the client device 102 can process the received map data in order to render it on the output device 103. The methods and routines described below can be executed by a processor (not depicted) of the client device 102.

Figure 2:
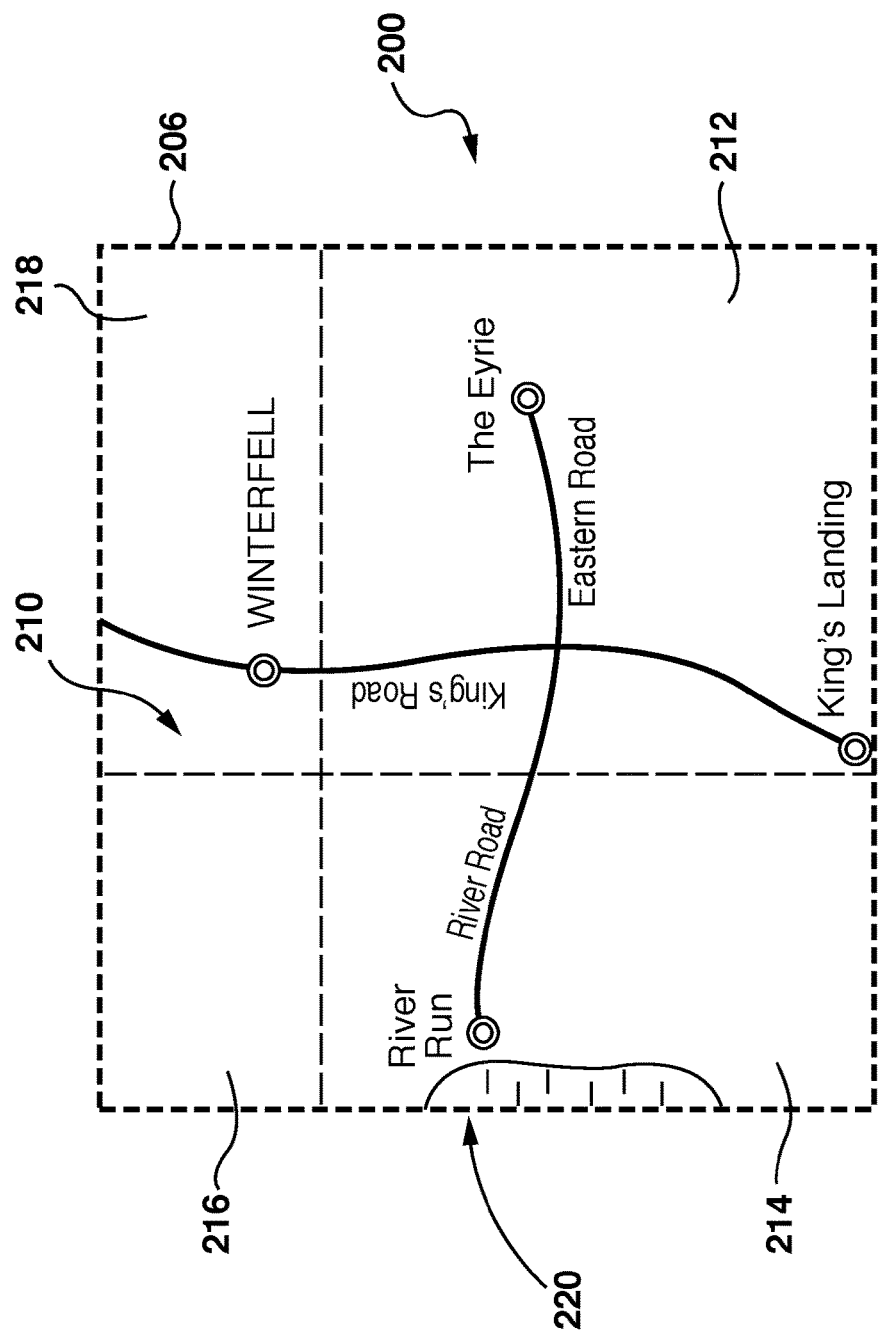
FIG. 2 depicts a user interface, the user interface being presentable on an output device of a client device of the system of FIG. 1.

With reference to FIG. 2, there is depicted a user interface 200, the user interface 200 being presentable on the output device 103. The user interface 200 can be generated by the image application 106.

To facilitate understanding, the method and routines described below, it will be assumed that the image view received by the client device 102 is a image view 206 depicted in FIG. 2 (also referred to herein below as "map view" or "map image"). In some non-limiting embodiments, the image view 206 is received in the Scalable Vector Graphics (SVG) format, which is an XML-based vector image format for two-dimensional graphics with support for interactivity and animation. The SVG specification is an open standard developed by the World Wide Web Consortium (W3C).

The user 104 can request the client device 102 to display the user interface 200 and to select the image view 206 to be displayed. How the selection of the image view 206 is done is not particularly limited. For example, the user 104 can enter using an input device (not depicted), such as a keyboard and a mouse for example, an indication of the desired image view 206 (for example, by typing in an address, a Point Of Interest name and the like).

In the example illustrated in FIG. 2, the user 104 may have searched for "Restaurants in Westeros" and as such wants the result of the search to display, on the user interface 200 of the client device 102, the image view 206 showing the location of restaurants in Westeros. In this example, the image view 206 provides a map of "Westeros" and the associated information corresponds to the location of restaurants in Westeros and other information relating to these restaurants, such as, for example, address, telephone number, website, and reviews to name a few.

In another example, the image application 106 can be programmed to provide the location of local points of interest on a mobile instance of the client device 102, the map view 206 to be requested is generated based on the current location of the client device 102, using an IP address or GPS coordinates for example. The boundaries of the map view 206 to be requested can be determined from a predetermined radius from the current location of the client device 102 or from such a radius selected by the user 104 of the client device 102.

In another example, on the image application 106 is programmed to provide an interactive map of the nearest locations of a particular chain of coffee shops for example, the user 104 only has to launch the image application 106 in order to send the request for the desired map view 206. The image application 106 uses the current location of the client device 102 to request the map view 206.

Schematically depicted in FIG. 2 is a plurality of map tiles 210 (shown in ghost lines). The plurality of map tiles 210 includes: a first map tile 212 (visible in its entirety), a second map tile 214, a third map tile 216 and a fourth map tile 218 (the latter three only partially visible within a viewport 220 of the image view 206 of FIG. 2). In accordance with embodiments of the present technology, the image view 206 is generated based on the plurality of map tiles 210, the plurality of map tiles 210 corresponding to a particular one of the viewport 220 and a particular zoom level (not numbered). Thus, the map view 206 of FIG. 2 can be the to be associated with the particular viewport 220 and the particular zoom level.

In response to the user request for the map view 206, the client device 102 generates a first request 160 (FIG. 1), the first request 160 containing a request for the map view 206. The first request 160 contains indication of the viewport 220 and the zoom level so-requested by the user 104.

In order to generate the map view 206, in response to the first request 160, the image server 112 generates a first message 162 (FIG. 1), the first message 162 containing a subset of the plurality of map tiles 210 for generating the requested map view 206.

The subset of the plurality of map tiles 210 is generated as follows.

Figure 3:
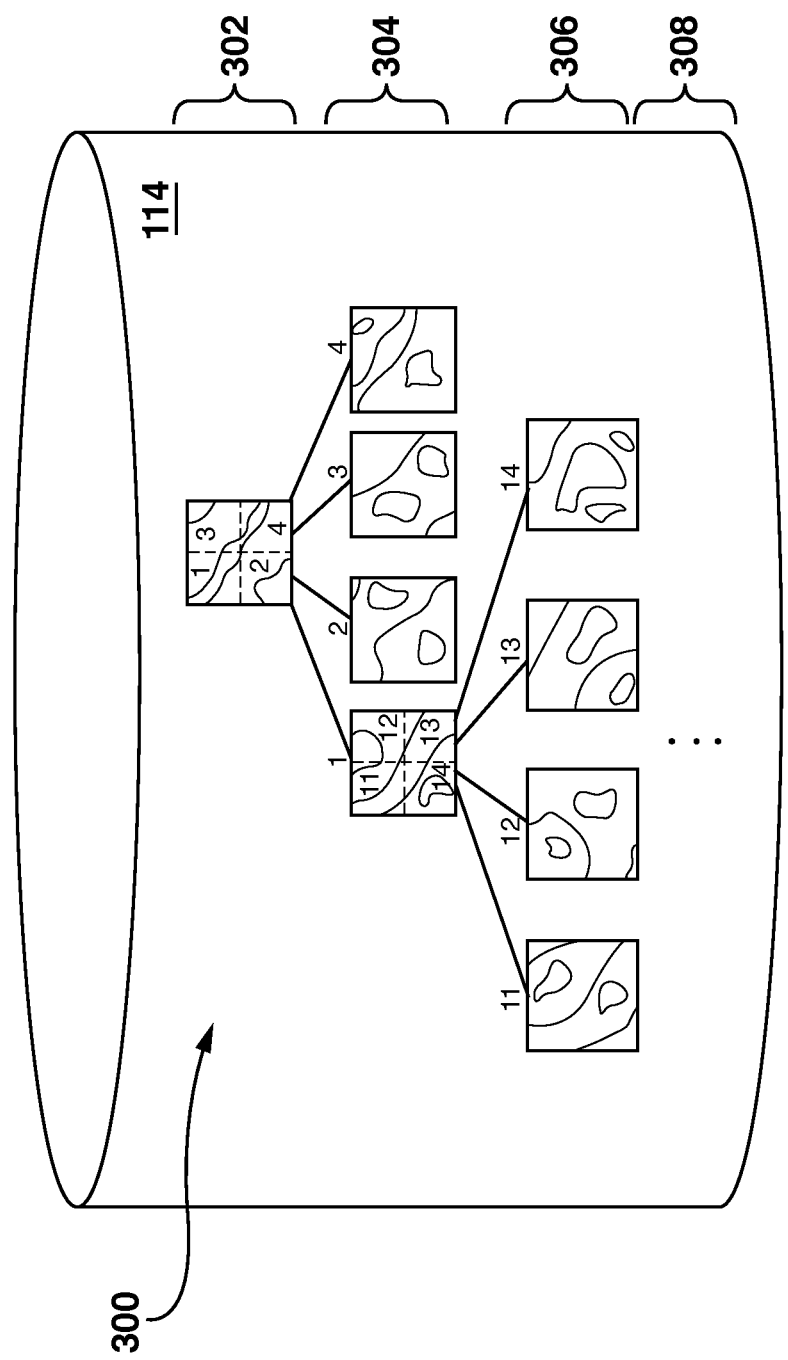
FIG. 3 is a schematic illustration of a hierarchical structure implemented as a tree structure in accordance with some embodiments of the present technology, the hierarchical structure maintained by an image server of the system of FIG. 1.

The image database 114 is configured to maintain files containing the plurality of map tiles 210 (such as an entire plurality of map tiles 210 required for generating all possible map views with all possible viewports 220 and zoom levels). In some embodiments of the present technology, the image database 114 maintains files associated with the plurality of map tiles 210 in a hierarchical structure. In some embodiments of the present technology, the hierarchical structure can be implemented as a tree structure 300 depicted with reference to FIG. 3. It should be noted that the tree structure 300 of FIG. 3 is just one embodiment thereof and other implementations are possible. In accordance with embodiments of the present technology, each level 302, 304, 306, 308 of the tree structure 300 corresponds to a particular zoom level. In other words, each level 302, 304, 306, 308 contains a subset of the plurality of tiles 210 associated with various viewports 220 of a given zoom level.

A higher level 302, 304, 306, 308 can be called a "parent level", while a lower level 302, 304, 306, 308 can be called a "child level". In accordance with embodiments of the present technology, a given tile of the parent level 302, 304, 306, 308 has four corresponding tiles in the child level 302, 304, 306, 308. Generally speaking and as schematically illustrated in FIG. 3, the parent level map tiles are associated with the lower level of zoom (i.e. fewer details and/or lower quality) and the child level map tiles are associated with the higher level of zoom (i.e. more details and/or higher level of quality).

Figure 10:
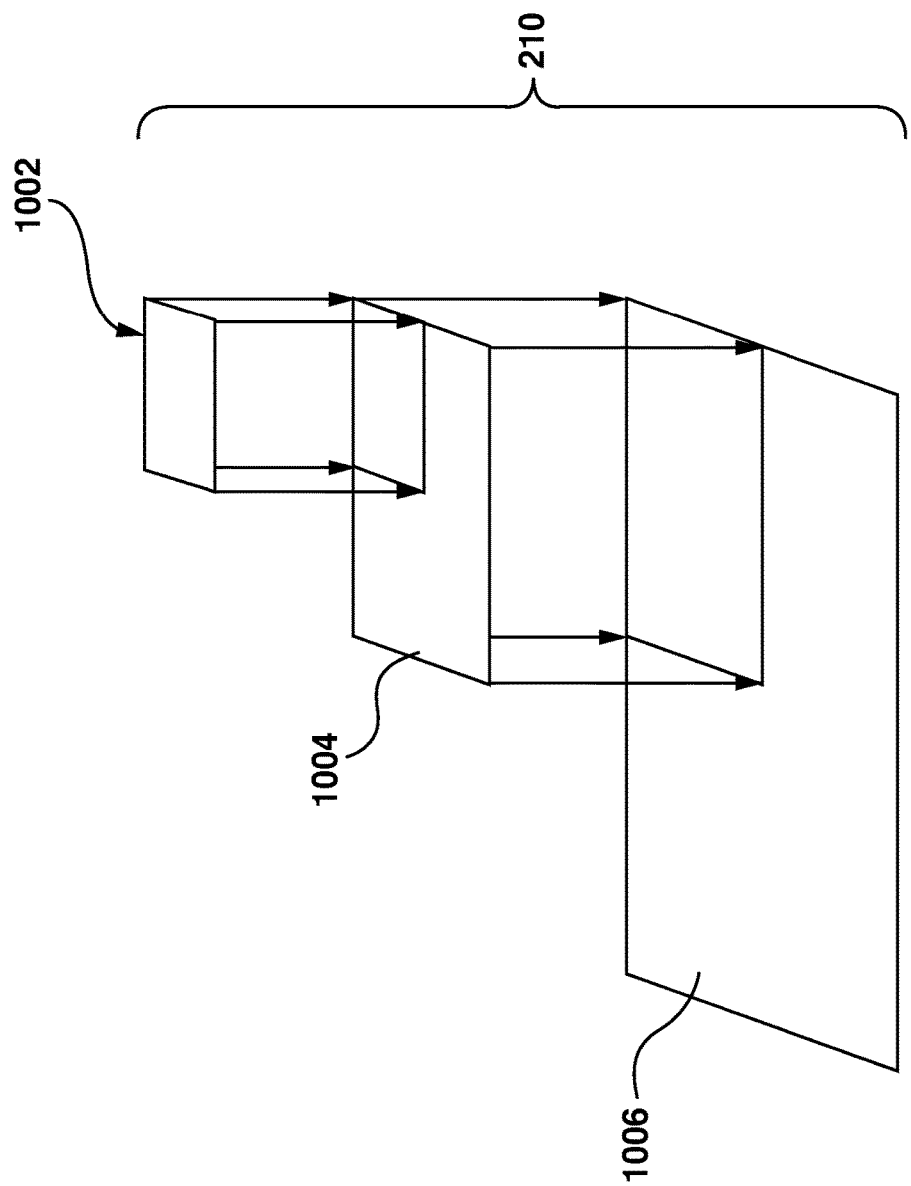
FIG. 10 is schematic illustration of a hierarchical relationship between parent level map tiles and child level map tiles.

This hierarchical relationship is further schematically illustrated with reference to FIG. 10, which schematically depicts a portion of the map tiles 210. There are shown map tiles of three zoom levels—four map tiles of the first level 1002 (only one is depicted) make up a map tile of the second level 1004. Four map tiles of the second level 1004 (only one is depicted) make up a map tile of the third level 1006.

When the user 104 requests a change in the zoom level (for example from the current zoom level to a higher zoom level (for example, "zoom+1" zoom level), a given map tile of the current zoom level (i.e. a given tile of the current level 302, 304, 306, 308) is replaced with its four child map tiles (i.e. four map tiles of a lower level 302, 304, 306, 308). In the illustration of FIG. 10, a map tile of the second level 1004 would be replaced with four map tiles of the first level 1002.

In other words, when the user 104 requests a change in the zoom level to the "zoom+1" zoom level, the four child map tiles (i.e. four map tiles of a lower level 302, 304, 306, 308) are rendered and displayed instead of the single given map tile of the current zoom level (i.e. a given tile of the current level 302, 304, 306, 308)—four map tiles of the first level 1002 (only one is depicted) replace a map tile of the second level 1004.

The process applies vice versa when the user 104 requests a lower zoom level (i.e. the "zoom−1" zoom level). Naturally, the user 104 can request the change in zoom level having a larger magnitude than plus/minus one. As such, the user 104 can request the change in zoom level having a different magnitude, such as plus/minus two levels, plus/minus three levels and the like.

Higher Zoom Level Downloading Process

In accordance with embodiments of the present technology, when the user 104 requests a higher zoom level (i.e. "zoom+1" zoom level or the like), the image server 112 is configured to execute a prioritized downloading of map tiles 210. For the purposes of the description below, the zoom level displayed in FIG. 2 is considered to be the current zoom level and the sub-set of plurality of map tiles 210 used for displaying the map view 206 of FIG. 2 has been downloaded from the image server 112 to the client device 102 and stored in an internal memory, such as cache (which is not depicted), of the client device 102.

Upon the user 104 changing the zoom level from the current zoom level (i.e. the one depicted in FIG. 2) to a different zoom level (for example, to a higher zoom level, such as "zoom+1" zoom level or higher), the client device 102 generates a second request 164 (depicted in FIG. 1), the second request 164 containing a request for another zoom level (i.e. the higher zoom level).

The image server 112 selects another subset of the plurality of map tiles 210, the another subset of the plurality of map tiles 210 for rendering and displaying the image view 206 at the higher zoom level.

Figure 4:
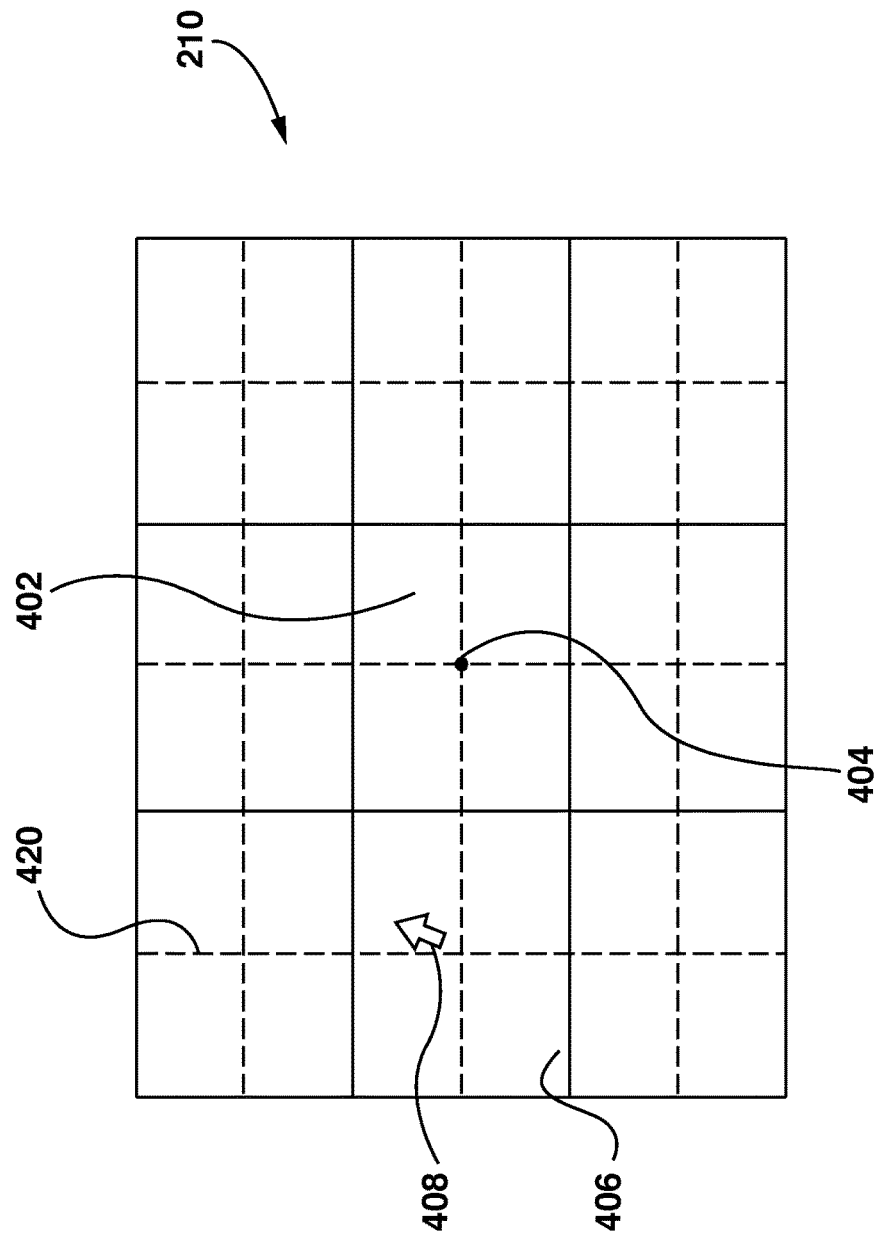
FIG. 4 is a schematic illustration of a plurality of map tiles, the plurality of map tiles schematically representing the subset of the plurality of map tiles currently used for rendering and displaying the map view on the user interface of FIG. 2.

With reference to FIG. 4, there is depicted the plurality of map tiles 210, the plurality of map tiles 210 schematically representing the subset of the plurality of map tiles 210 currently used for rendering and displaying the map view 206 of FIG. 2.

The image server 112 first selects a replacement sub-portion 420 of the plurality of map tiles 210, the replacement sub-portion 420 of the plurality of map tiles 210 to replace the sub portion of map tiles 210 currently used for rendering and displaying the map view 206. The selection of the replacement sub-portion 420 can be executed using the above-mentioned hierarchical structure 300. As will be recalled, for each map tile of the sub-portion of map tiles 210 used for displaying the current version of the image view 206, there are four child map tiles of the replacement sub-portion 420.

The image server 112 first selects a so-called "anchor point" in order to determine the so-called "anchor tile". In some embodiments, the image server 112 selects a central-most map tile 402 as the anchor tile, the central-most map tile 402 hosting a central point 404 of the image view 206 (the central point of the image view 206 being the anchor point). In alternative embodiments, the image server 112 selects an active tile 406 as the anchor tile, the active tile 406 being associated with a position of a cursor 408 over the map view 206 (the position of the cursor 408 being the anchor point).

Some of the above approaches are more appropriate in certain specific circumstances, others of the above approaches can be more appropriate in other circumstances of the embodiments of the present technology. For example, in those embodiments where the user 104 has selected a higher zoom level using a "scroll wheel" of a mouse (not depicted) associated with the client device 102 or using a track pad (not depicted) associated with the client device 102, the image server 112 selects the active tile 406 as the anchor tile based on the anchor point being the location of the cursor 408.

On the other hand, in those embodiments where the user 104 has selected a higher zoom level using "soft keys" (such as plus/minus zoom levels or other indicators provided as part of the map view 206), the image server 112 selects the central-most map tile 402 as the anchor tile based on the anchor point being the central point of the image view 206.

Naturally, the anchor tile can be selected in a number of different ways depending on the specific implementations of the image application 106.

The image server 112 then organizes the replacement sub-portion 420 of the plurality of map tiles 210 for transmission to the client device 102 as follows.

First, the image server 112 selects the four child map tiles associates with the anchor tile (in this examples, either the central-most map tile 402 or the active map tile 406). For the sake of illustration, it shall be assumed that the image server 112 has selected the central-most tile 402 as the anchor tile. Thus, the image server 112 first selects the four child map tiles associated with the central-most map tile 402. The image server 112 then generates a second message 166 (FIG. 1), the second message 166 containing the four child map tiles associated with the central-most map tile 402. The image server 112 then transmits the second message 166 to the client device 102. The second message 166 causes the client device 102 to (i) replace in its memory (such as cache) the central-most map tile 402 with the four child map tiles sent as part of the second message 166 and (ii) to render and display a map viewport associated with four child map tiles instead of the central-most map tile 402.

The image server 112 then selects an adjacent map tile, the adjacent map tile being proximate to the central-most map tile 402. For illustration, let's assume that the adjacent tile is the active tile 406. However, the adjacent tile can be any of the map tiles depicted in FIG. 4 as they are all adjacent to the central-most map tile 402.

The image server 112 then repeats the process of selecting four child map tiles associated with the adjacent map tile (in this case, the active map tile 406). The image server 112 then transmits a message similar to the second message 166 to the client device 102 albeit containing the four child map tiles associated with the adjacent map tile. The image server 112 then repeats the process of selecting and transmitting child image tiles, until all of the replacement sub-portions 420 of the plurality of map tiles 210 have been transmitted to the client device 102 (i.e. until the replacement sub-portions 420 of the plurality of map tiles 210 that are required for the new viewport have been transmitted). Naturally, it is possible that there are more than nine adjacent tiles present within the image view 206, as such, the image server 112 can repeat the above-described process an necessary.

Furthermore, it should be understood that even though in some embodiments each one of the second messages 166 are sent one at a time, this needs not be so in every embodiment of the present technology. As such, some or all of the second messages 166 can be sent in groups of two or more, however, replacement of "old" (i.e. previously used) map tiles 210 within the local memory of the client device 102 is still executed one at a time.

Given the architecture described above, it is possible to execute a method for downloading image tile data from the image server 112 to the client device 102. It should be recalled that the image tile data is organized, by the image server 112, in a hierarchical structure (such as but not limited to the tree structure 300 of FIG. 3), where each level 302, 304, 306, 308, 310 of the hierarchical structure 300 stores a sub-set of image tiles associated with a particular resolution level (such as but not limited to zoom level).

For the purposes of the description to be presented herein below, it shall be assumed that the client device 102 displays, using the output device 103, the image view 206 (being the first image view 206), the first image view 206 being associated with a first viewport and a first resolution level. The first image view 206 has been generated using a portion of the plurality of the first-level map tiles 210 associated with the first resolution level, the portion being determined by the first viewport. The portion of the plurality of the first-level map tiles 210 has been (i) downloaded by the client device 102 from the image server 112 as part of the first message 162 and (ii) stored by the client device 102 in the memory (such as cache) to enable rendering thereof.

Figure 5:
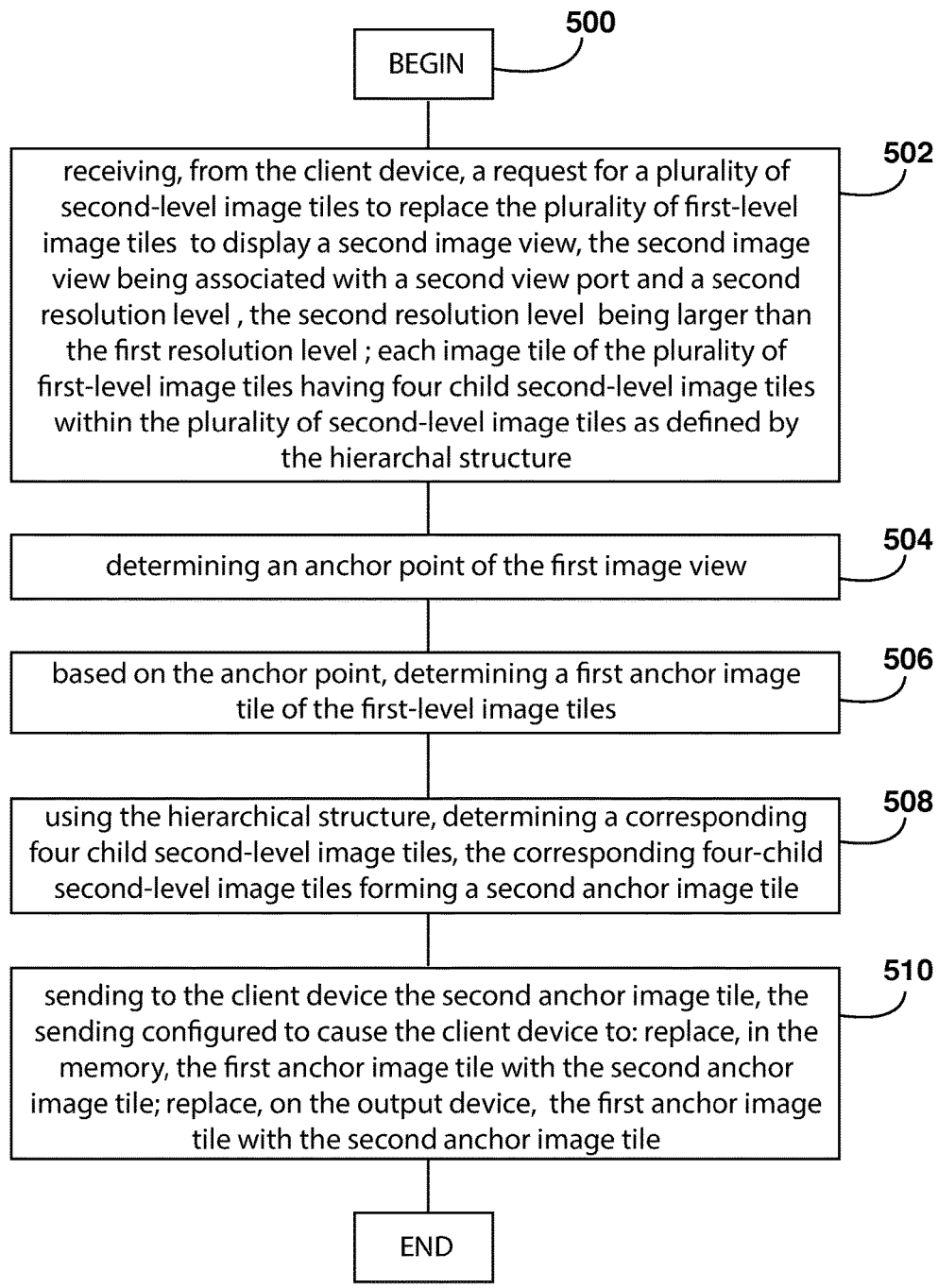
FIG. 5 depicts a block diagram of a flow of a method executable by the image server of the system of FIG. 1.

With reference to FIG. 5, there is depicted a flow chart of a method 500, the method 500 executable by the image server 112.

Step 502—Receiving, from the Client Device, a Request for a Plurality of Second-Level Image Tiles to Replace the Plurality of First-Level Image Tiles to Display a Second Image View, the Second Image View being Associated with a Second Viewport and a Second Resolution Level, the Second Resolution Level being Larger than the First Resolution Level; Each Image Tile of the Plurality of First-Level Image Tiles Having Four Child Second-Level Image Tiles within the Plurality of Second-Level Image Tiles as Defined by the Hierarchical Structure The method 500 starts at step 502, where the image server 112 receives, from the client device 102, a request for a plurality of second-level image tiles to replace the plurality of first-level image tiles to display a second image view, the second image view being associated with a second viewport and a second resolution level, the second resolution level being larger than the first resolution level that is currently being displayed. This step can be executed by means of the image server 112 receiving the second request 164 described above. It is noted that step 502 is executed in response to a request from the user 104 to change the zoom level.

It should be recalled that each image tile of the plurality of first-level map tiles 210 has four child second-level image tiles within the plurality of second-level image tiles 420 as defined by the hierarchical structure 300.

Step 504—Determining an Anchor Point of the First Image View

At step 504, the image server 112 determines an anchor point 404, 408 of the first image view 206.

In some embodiments of the present technology, determining the anchor point of the first image view comprises receiving an indication of the anchor point from the client device 102 (for example, as part of the second request 164).

In some embodiments of the present technology, indication of the anchor point corresponds to a center-point of the first image view 206. In other embodiments of the present technology, the anchor point corresponds to a cursor position 408 over the first image view 206.

Step 506—Based on the Anchor Point, Determining a First Anchor Image Tile of the First-Level Image Tiles The image server 112 then, based on the anchor point 404, 408, determines a first anchor image tile 402, 406 of the first-level map tiles 210.

Step 508—Using the Hierarchical Structure, Determining a Corresponding Four Child Second-Level Image Tiles, the Corresponding Four Child Second-Level Image Tiles Forming a Second Anchor Image Tile The image server 112, then using the hierarchical structure 300, determines a corresponding four child second-level image tiles, the corresponding four child second-level image tiles forming a second anchor image tile.

Step 510—Sending to the Client Device the Second Anchor Image Tile, the Sending Configured to Cause the Client Device to: Replace, in the Memory, the First Anchor Image Tile with the Second Anchor Image Tile; Replace, on the Output Device, the First Anchor Image Tile with the Second Anchor Image Tile The image server 112 then sends to the client device 102 the second anchor image tile, the sending configured to cause the client device 102 to: replace, in the memory, the first anchor image tile with the second anchor image tile; replace, on the output device 103, the first anchor image tile with the second anchor image tile. Step 610 is executed by means of the image server 112 sending to the client device 102 the second message 166.

In some embodiments of the present technology, the sending to the client device 102 the second anchor image tile (i.e. the second message 166) further comprises sending an instruction, the instruction to cause the client device 102 to execute the steps of: replacing, in the memory, the first anchor image tile with the second anchor image tile; replacing, on the output device 103, the first anchor image tile with the second anchor image tile.

In alternative embodiments, the instruction to execute the replacing steps is stored by the client device 102.

In additional embodiments of the present technology, the additional instruction (either sent as part of the second message 166 or stored by the client device 102) is configured to cause the client device 102 to render the second anchor image tile.

The image server 112, then, determines a first adjacent image tile of the first-level image tiles, the first adjacent image tile being adjacent to the first anchor image tile of the first-level image tiles. The, the image server 112, using the hierarchical structure 300, determines a corresponding four child second-level image tiles for the first adjacent image tile, the corresponding four child second-level image tiles forming a second adjacent image tile. The image server 112 then sends to the client device 102 the second adjacent image tile, the sending configured to cause the client device 102 to: replace, in the memory, the first adjacent image tile with the second adjacent image tile; replace, on the output device, the first adjacent image tile with the second adjacent image tile.

The image server 112, then, determines a third adjacent image tile of the first-level image tiles, the third adjacent image tile being adjacent to the first anchor image tile of the first-level image tiles. The image server 112 then, using the hierarchical structure 300, determines a corresponding four child second-level image tiles for the third adjacent image tile, the corresponding four child second-level image tiles forming a fourth adjacent image tile. The image server 112 then sends to the client device 102 the fourth adjacent image tile, the sending configured to cause the client device 102 to: replace, in the memory, the third adjacent image tile with the fourth adjacent image tile; replace, on the output device, the third adjacent image tile with the fourth adjacent image tile.

The method 500 can then terminate or await another instruction similar to that in the second request 164.

Lower Zoom Level Downloading Process

What has been described above is the process downloading map tiles 210 when the user 104 requests a new zoom level that is higher than the current zoom level (i.e. "zoom+1" zoom level or above. In those embodiments where the user 104 requests lower zoom level, the downloading of new map tiles can be executed as follows.

For the description to be presented below, it will be assumed that the user 104 has requested the map view 206. Similarly to what was described above, in response to the user request for the map view 206, the client device 102 generates the first request 160 (FIG. 1), the first request 160 containing a request for the map view 206. The first request 160 contains indication of the viewport 220 and the zoom level so-requested by the user 104. It can also be the that the first request 160 contains the "current viewport" request information.

At the time of the processing the user request (i.e. the first message 162), in some embodiments of the present technology, the image server 112 executes the process as follows. In other words, the first request 160 causes the image server 112 to execute the following process.

Figure 6:
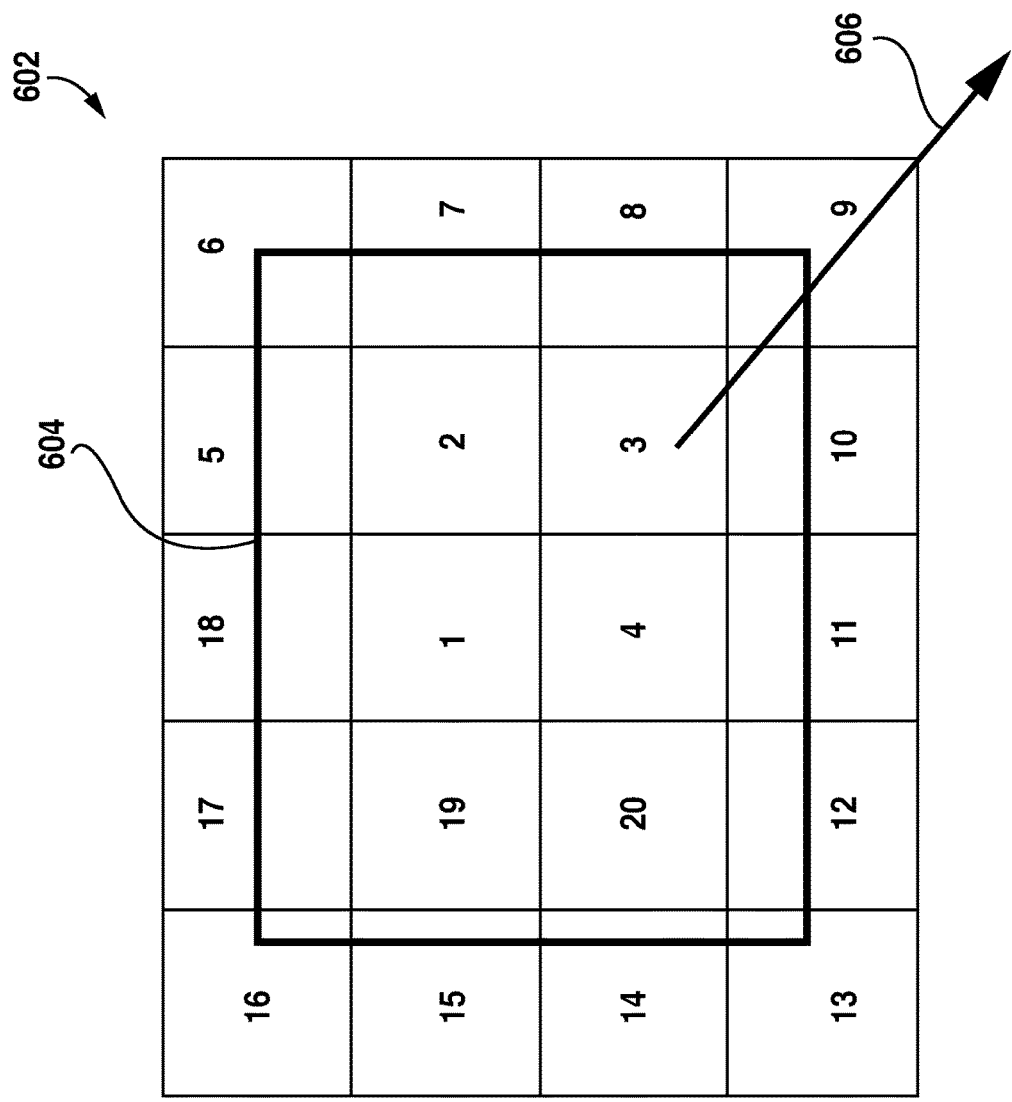
FIG. 6 is a schematic representation of map tiles required for rendering and displaying the given map view on the user interface of FIG. 2.

With reference to FIG. 6, there is depicted a schematic representation of map tiles 602 required for rendering and displaying the given map view 206 (map tiles 602 will be used to describe embodiments of the present technology from here onwards instead of map tiles 210 used as example above).

The given map view 206 is associated with a particular zoom level and a particular viewport schematically depicted in FIG. 6 at 604. Each one of the map tiles 602, is enumerated with a number from one to twenty—the numbers do not signify any sequence, but are used for referring to a particular one of the map tiles 602, such as a first map tile 602, a second map tile 602 or a twentieth map tile 602.

As can be seen in the illustration of FIG. 6, in order to render and display the given map view 206, some of the map tiles 602 are needed in their entirety (such as the first, the second, the third, the ninetieth and the twentieth map tiles 602), while the others are only partially needed (such as the fifth, the sixth, the seventh, the eighth, the ninth, the eleventh, the twelve, the thirteenth, the fourteenth, the fifteenth, the sixteenths, the seventeenths, the eighteenths map tiles 602). Put another way, twenty instances of the map tiles 602 (used partially or in their entirety) are required for rendering and displaying the given map view 206 having the particular zoom level and the particular viewport 604.

For the purpose of the description to be presented below, it will be assumed that the user 104 is desirous of moving the particular viewport 604 in a direction depicted at 606 to new viewport (not depicted). In accordance with embodiments of the present technology, in order to avoid a situation of a "blank screen" (i.e. when one or more portions of the map view 206 are displayed in white or otherwise distorted) when transitioning from the particular viewport 604 to the new viewport in the direction of the arrow 606, the image server 112 causes downloading of a number of map tiles 602 in addition to the map tiles 602 required for rendering and displaying the given map view 206 with the particular viewport 604 at a point in time before the user 104 has indicated the desire to move the particular viewport 604.

In some embodiments, these additional map tiles are downloaded at the same time as the map tiles 602 (for example, as part of the first request 160 depicted in FIG. 1). In other embodiments, these additional map tiles are downloaded at a predetermined point in time after downloading the map tiles 602 (such as after 1 second, after 10 seconds and the like). For ease of reference, the zoom level of the particular viewport 604 will be denoted as "current zoom level" and a zoom level that is lower then the current zoom level will be denoted as "zoom−1" zoom level.

Figure 7:
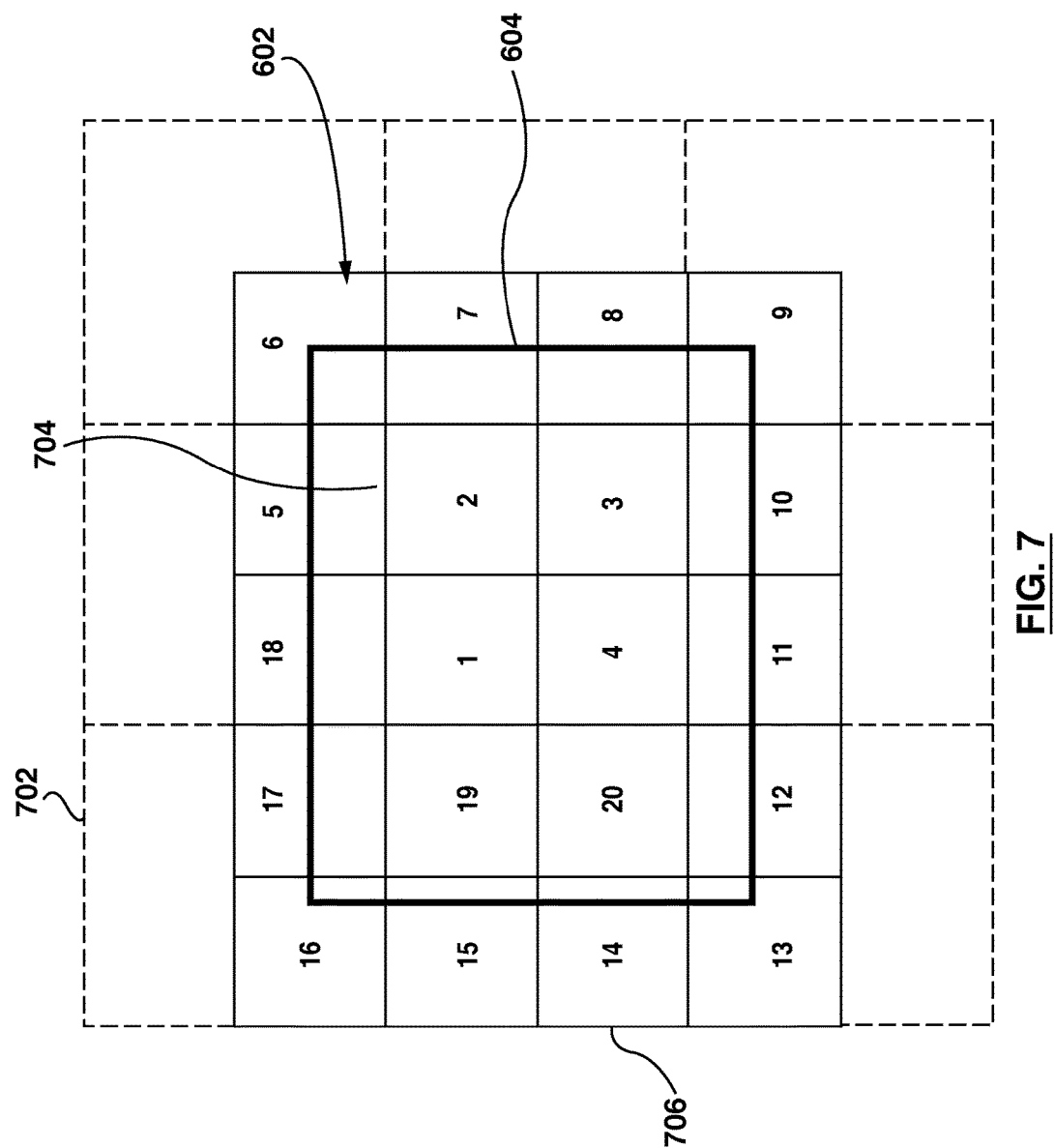
FIG. 7 is a schematic representation of the map tiles as in FIG. 6, as well as a plurality of additional map tiles, the plurality of additional map tiles for rendering and displaying a modified map view at a "zoom–1" zoom level (the plurality of map tiles of "zoom–1" zoom level are shown in dashed lines).

With reference to FIG. 7, there is schematically depicted the map tiles 602 required for rendering and displaying the given map view 206, as well as a plurality of additional map tiles 702, the plurality of additional map tiles 702 for rendering and displaying a modified map view at the "zoom−1" zoom level (the plurality of map tiles of "zoom−1" zoom level are shown in dashed lines).

As will be recalled, the above-described tree structure 300 maintains map tile information at various levels 302, 304, 306, 308, each level of the tree structure 300 corresponding to a particular zoom level. In other words, each level 302, 304, 306, 308 contains a subset of the plurality of tiles 210 associated with various viewports of a given zoom level.

It should be also recalled that the higher level 302, 304, 306, 308 can be called the "parent level", while the lower level 302, 304, 306, 308 can be called a "child level" (as well as the map tiles, which respective data is stored in the associated level 302, 304, 306, 308). It should also be recalled that a given tile of the parent level 302, 304, 306, 308 has four corresponding tiles in the child level 302, 304, 306, 308.

Accordingly as can be seen in FIG. 7, some of the map tiles 602 (the first, the second, the third, and the fourth map tiles 602, as well as the fourteenth, the fifteenth, nineteenth, and the twentieth map tiles 602) are "children" map tiles of the map tiles of the "zoom−1" zoom level and they would have to be downloaded as part of the map tiles 602 required for rendering and displaying the particular viewport 604 at the current zoom level.

Embodiments of the present technology are based on the premise that parent map tiles of particular map tiles that are downloaded as part of the map tiles 602 are "preloaded" together with the map tiles 602 and are used for rendering and displaying a transition view while the actual map tiles required for the new viewport are downloaded. In some embodiments of the present technology, an entirety of the parent tiles of the particular map tiles can be preloaded. In other embodiments a sub-set of the parent tiles of the particular map tiles can be preloaded, the sub-set being selected as described immediately below.

More specifically, for those four map tiles of the particular zoom level (i.e. the current zoom level) that are to be downloaded as part of the map tiles 602, the associated parent map tiles of the lower zoom level (i.e. the "zoom−1" zoom level) is not preloaded. In other words, the parent map tiles associated with some of the map tiles 602 (as the first, the second, the third, and the fourth map tiles 602, as well as the fourteenth, the fifteenth, nineteenth, and the twentieth map tiles 602) that have all their respective child tiles are contained within the map tiles 602. These are the parent map tiles enumerated at 704, 706—as all of their respective child tiles are contained within the map tiles 602.

In the illustrated example of FIG. 7, there are seven parent map tiles of the "zoom−1" zoom level that do not have all of their child map tiles 602 within the map tiles 602. For those parent tiles of the "zoom−1" zoom level that do not have all of their child map tiles within the map tiles 602, in accordance with embodiments of the present technology, those parent tiles will be downloaded as "transition map tiles" as part of downloading the map tiles 602. The term "transition map tiles" meant to denote those tiles that are downloaded but not immediately rendered/displayed.

When the user 104 indicates his or her desire to change the viewport 604, the "transition" of the viewport from the particular viewport 604 to the new viewport is executed. In accordance with embodiments of the present technology, the transition to the new viewport is executed as follows. When the user 104 indicates his or her desire to change the viewport, the client device 102 rendering and displays a "transition view", the transition view made up of the transition map tiles and the respective child image tiles that have been downloaded as part of the map tiles 602 (the first, the second, the third, and the fourth map tiles 602, as well as the fourteenth, the fifteenth, nineteenth, and the twentieth map tiles 602).

The client device 102 further requests the "native" map tiles required for rendering and generating the new viewport (for example, by sending a message similar to the first request 160 or the second request 164, both depicted in FIG. 1). In some embodiments of the present technology, the image server 112 can transmit the "missing map tiles" only (i.e. those that have not otherwise been downloaded as part of the map tiles 602 or the transition map tiles). In alternative embodiments, the image server 112 can transmit anew an entirety of the map tiles required for the new viewport. Once all the map tiles are downloaded to the client device 102, the client device 102 renders and displays the new viewport using the map tiles that are "native" for the requested viewport.

What has been described above works for a relatively small change in the viewport 604. Where it is anticipated that the change may be more drastic, the image server 112 can send additional transition map tiles of the zoom level that can be "zoom−2" zoom level, "zoom−3" zoom level and the like.

Figure 8:
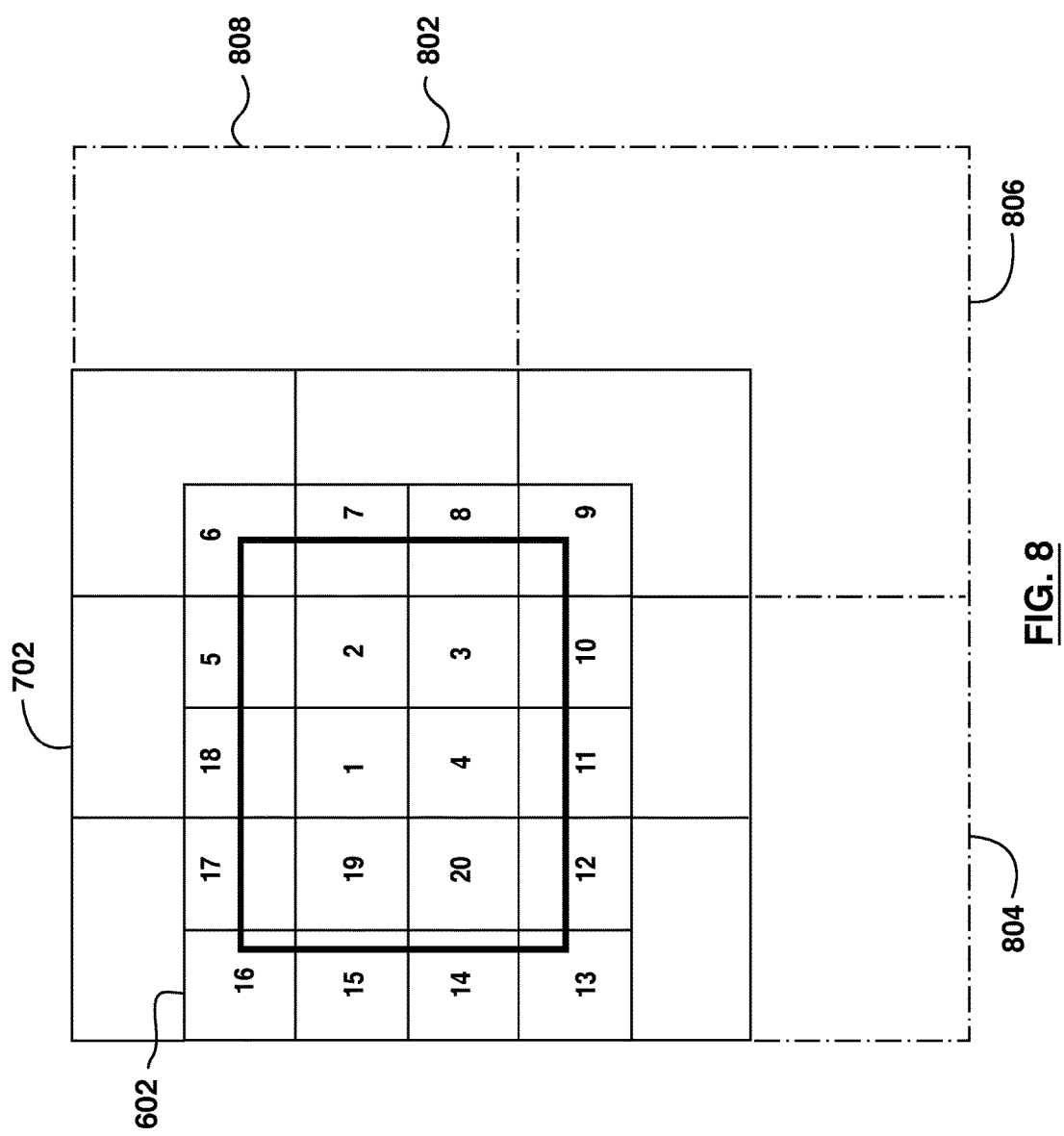
FIG. 8 is a schematic representation of the the map tiles of FIG. 6 and additional map tiles of FIG. 7, and another plurality of additional map tiles for rendering and displaying a further modified map view at the "zoom–2" zoom level (the plurality of map tiles of "zoom–2" zoom level are shown in dotted lines).

With reference to FIG. 8, there is schematically depicted the map tiles 602 required for rendering and displaying the given map view 206, the plurality of additional map tiles 702 for rendering and displaying a modified map view at the "zoom−1" zoom level (the plurality of map tiles of "zoom−1" zoom level are shown in dashed lines) and another plurality of additional map tiles 802 for rendering and displaying a further modified map view at the "zoom−2"

zoom level (the plurality of map tiles of "zoom-2" zoom level are shown in dotted lines).

Similarly to the description provided herein above in regard to FIG. 7, for those parent tiles of the "zoom-2" zoom level that do not have all of their child map tiles within the map tiles 602 (or within the transition map tiles), in accordance with embodiments of the present technology, those parent tiles will be downloaded as "additional transition map tiles" as part of downloading the map tiles 602. Within the illustration of FIG. 8, there are three parent map tiles of the "zoom-2" zoom level (enumerated at 804, 806 and 808) that do not have all of their child map tiles within the map tiles 602 (or within the transition map tiles) and, thus, they would be downloaded together with the map tiles 602 as the additional transition map tiles.

Conversely, the remaining depicted map tiles of the map tiles 802 has all four child tiles downloaded as part of the additional map tiles and such it would not be included in the additional transition map tiles.

Naturally, more parent map tiles can be included (i.e. for zoom levels of "zoom-3", "zoom-4", etc). The selection of the number of additional levels can be done by the image server 112 or the client device 102 (or a combination of both) based on cache memory size, computing resources and other factors of the client device 102 or the communication network 108. In some embodiments, the selection of the parent map tiles in based on a condition that at least one child map tile of a parent map tile to be downloaded as the transition map tile is displayed in the original viewport 604.

Figure 9:
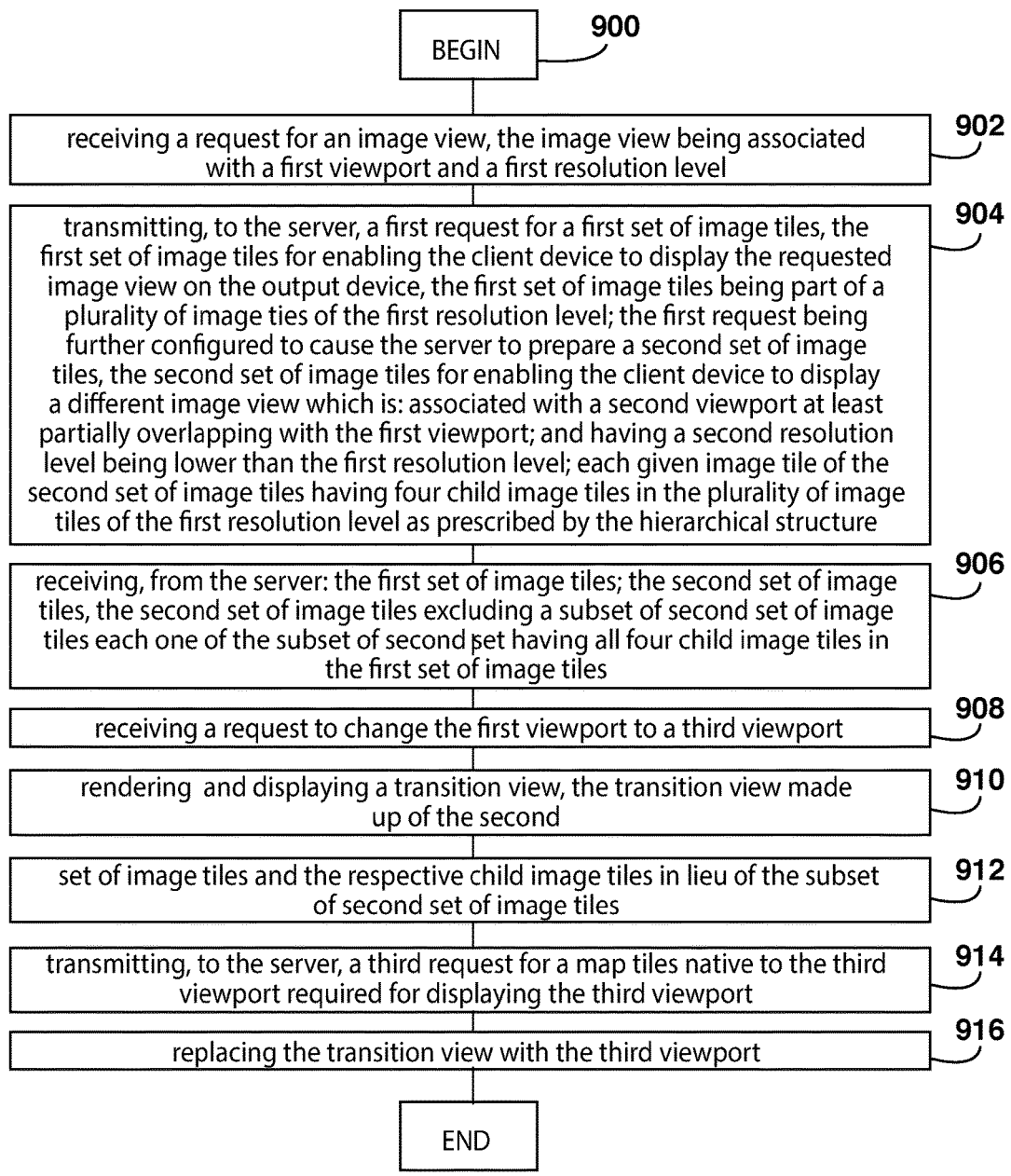
FIG. 9 depicts a block diagram of a flow of a method executable by the image server of the system of FIG. 1, the method being executed in accordance with additional embodiments of the present technology.

Given the architecture described above, it is possible to execute a method of downloading image tiles onto the client device 102. With reference to FIG. 9, there is depicted a block diagram of a method 900, the method 900 being implemented in accordance with non-limiting embodiments of the present technology.

Step 902—Receiving a Request for an Image View, the Image View being Associated with a First Viewport and a First Resolution Level The method 900 starts at step 902, where the client device 102 receives a request for a image view 206, the image view being associated with a first viewport 604 and a first resolution level.

As has been described above, receiving the request for the image view 206 can be executed by a number of means. As illustrated in FIG. 2, the user 104 can request the client device 102 to display the user interface 200 and to select the image view 206 to be displayed. How the selection of the image view 206 is done is not particularly limited. For example, the user 104 can enter using an input device (not depicted), such as a keyboard and a mouse for example, an indication of the desired image view 206 (for example, by typing in an address, a Point Of Interest name and the like).

Step 904—Transmitting, to the Server, a First Request for a First Set of Image Tiles, the First Set of Image Tiles for Enabling the Client Device to Display the Requested Image View on the Output Device, the First Set of Image Tiles being Part of a Plurality of Image Ties of the First Resolution Level; the First Request being further Configured to Cause the Server to Prepare a Second Set of Image Tiles, the Second Set of Image Tiles for Enabling the Client Device to Display a Different Image View which is: Associated with a Second Viewport at Least Partially Overlapping with the First Viewport; and Having a Second Resolution Level being Lower than the First Resolution Level; Each Given Image Tile of the Second Set of Image Tiles having Four Child Image Tiles in the Plurality of Image Tiles of the First Resolution Level as Prescribed by the Hierarchical Structure At step 904, the client device 102 transmit, to the image server 112, a first request for a first set of image tiles, the first set of image tiles for enabling the client device 102 to display the requested image view 206 on the output device, the first set of image tiles being part of a plurality of image ties of the first resolution level.

The first request is being further configured to cause the image server 112 to prepare a second set of image tiles, the second set of image tiles for enabling the client device 102 to display a different image view 206 which is: associated with a second viewport 604 at least partially overlapping with the first viewport 604; and having a second resolution level being lower than the first resolution level; each given image tile of the second set of image tiles having four child image tiles in the plurality of image tiles of the first resolution level as prescribed by the hierarchical structure.

Step 906—Receiving, from the Server: the First Set of Image Tiles; the Second Set of Image Tiles, the Second Set of Image Tiles Excluding a Subset of Second Set of Image Tiles Each One of the Subset of Second Set Having All Four Child Image Tiles in the First Set of Image Tiles At step 906, the client device 102 receives, from the image server 112: the first set of image tiles; the second set of image tiles, the second set of image tiles excluding a subset of second set of image tiles each one of the subset of second set having all four child image tiles in the first set of image tiles.

Step 908—Receiving a Request to Change the First Viewport to a Third Viewport

At step 908, the client device receives a request to change the first viewport 604 to a third viewport 604. The user 104 can indicate his or her desire to change the first viewport 604 to the third viewport 604 by any suitable means, such as "moving" the image view 206 using a mouse, scrolling, using keyboard keys and the like.

Step 910—Rendering and Displaying a Transition View, the Transition View Made Up of the Second Set of Image Tiles and the Respective Child Image Tiles in Lieu of the Subset of Second Set of Image Tiles Next, at step 910, the client device 102 renders and displays a transition view, the transition view made up of the second set of image tiles and the respective child image tiles in lieu of the subset of second set of image tiles.

Step 912—Transmitting, to the Server, a Third Request for a Map Tiles Native to the Third Viewport Required for Displaying the Third Viewport At step 912, the client device 102 transmits, to the image server 112, a third request for a map tiles native to the third viewport required for displaying the third viewport.

Step 914—Rendering the Different Image View Using the Map Tiles Native to the Third Viewport Next, at step 914, the client device 102 renders the different image view using the map tiles native to the third viewport. The map tiles native to the third viewport having been received by the client device 102 from the image server 112 in response to the third request sent as part of step 912.

Step 916—Replacing the Transition View with the Different Image View

At step 916, the client device 102 replaces the transition view with the different image view.

Higher Zoom Level Downloading Process

From a certain perspective, embodiments of the present technology can be summarized as follows, structured in numbered clauses:

CLAUSE 1. A method (500) for downloading image tile data (210) from a server (112) to a client device (102), the image tile data being organized, by the server, in a hierarchal structure (300), where each level (302, 304, 306, 308) of the hierarchal structure stores a subset of image tiles associated with a particular resolution level;

the client device including a memory and an output device, the client device being connectable to the server via a communication network (108), the output device displaying a first image view (206), the first image view being associated with a first viewport (220, 604) and a first resolution level, the first image view being generated using a portion of the plurality of the first-level image tiles associated with the first resolution level, the portion being determined by the first viewport;

the portion of the plurality of the first-level image tiles having been (i) downloaded by the client device from the server and (ii) stored by the client device in the memory to enable rendering thereof;

the method being executable by the server;

the method comprising:

receiving (502), from the client device, a request (160, 164) for a plurality of second-level image tiles to replace the plurality of first-level image tiles to display a second image view, the second image view being associated with a second view port and a second resolution level, the second resolution level being larger than the first resolution level; each image tile of the plurality of first-level image tiles having four child second-level image tiles within the plurality of second-level image tiles as defined by the hierarchal structure;

determining (504) an anchor point (404, 408) of the first image view;

based on the anchor point, determining (506) a first anchor image tile (402, 406) of the first-level image tiles;

using the hierarchical structure, determining (508) a corresponding four child second-level image tiles, the corresponding four-child second-level image tiles forming a second anchor image tile;

sending (510) to the client device the second anchor image tile, the sending configured to cause the client device to:

replace, in the memory, the first anchor image tile with the second anchor image tile;

replace, on the output device, the first anchor image tile with the second anchor image tile.

CLAUSE 2. The method of clause 1, further comprising, after the sending to the client device the second anchor image tile:

determining a first adjacent image tile (406) of the first-level image tiles, the first adjacent image tile being adjacent to the first anchor image tile of the first-level image tiles;

using the hierarchical structure, determining a corresponding four child second-level image tiles for the first adjacent image tile, the corresponding four-child second-level image tiles forming a second adjacent image tile;

sending to the client device the second adjacent image tile, the sending configured to cause the client device to:

replace, in the memory, the first adjacent image tile with the second adjacent image tile;

replace, on the output device, the first adjacent image tile with the second adjacent image tile.

CLAUSE 3. Method of either one clause 1 or 2, further comprising, after the sending to the client device the second adjacent image tile:

determining a third adjacent image tile of the first-level image tiles, the third adjacent image tile being adjacent to the first anchor image tile of the first-level image tiles;

using the hierarchical structure, determining a corresponding four child second-level image tiles for the third adjacent image tile, the corresponding four-child second-level image tiles forming a fourth adjacent image tile;

sending to the client device the fourth adjacent image tile, the sending configured to cause the client device to:

replace, in the memory, the third adjacent image tile with the fourth adjacent image tile;

replace, on the output device, the third adjacent image tile with the fourth adjacent image tile.

CLAUSE 4. The method of any one clause of 1 to 3, wherein the determining the anchor point of the first image view comprises receiving an indication of the anchor point from the client device.

CLAUSE 5. The method of clause 4, wherein the indication of the anchor point corresponds to a center-point of the first viewport.

CLAUSE 6. The method of clause 4, wherein the indication of the anchor point corresponds to a cursor position over the first viewport.

CLAUSE 7. The method of any one of clauses 1 to 6, wherein the hierarchical structure is a quad tree data structure.

CLAUSE 8. The method of any one of clauses 1 to 7, wherein the image tiles comprise map tiles and the resolution level comprises a zoom level.

CLAUSE 9. The method of any one of clauses 1 to 8, wherein the image tiles comprise game textures and the resolution level comprises a detailing level.

CLAUSE 10. The method of any one of clauses 1 to 9, wherein the sending to the client device the second anchor image tile further comprises sending an instruction, the instruction to cause the client device to:

replace, in the memory, the first anchor image tile with the second anchor image tile;

replace, on the output device, the first anchor image tile with the second anchor image tile.

CLAUSE 11. The method of any one of clauses 1 to 9, wherein the sending to the client device the second anchor image causes the client device to:

replace, in the memory, the first anchor image tile with the second anchor image tile;

replace, on the output device, the first anchor image tile with the second anchor image tile;

the steps of replacing being executed based on computer-executable instructions stored by the client device.

CLAUSE 12. The method of any one of claims 1 to 11, wherein the memory comprises a cache memory.

CLAUSE 13. The method of any one of clauses 1 to 12, wherein the sending to the client device the second anchor image tile is further configured to cause the client device to:

render the second anchor image tile.

CLAUSE 14. A processor comprising a memory storage coupled to the processor, the memory storage for storing image tile data; the image tile data being organized, by the server, in a hierarchal structure, where each level of the hierarchal structure stores a subset of image tiles associated with a particular resolution level; a communication interface for allowing the server be connectable to a client device via a communication network, the client device including a memory and an output device, the output device displaying a first image view, the first image view being associated with a first viewport and a first resolution level, the first image view being generated using a portion of the plurality of the first-level image tiles associated with the first resolution level, the portion being determined by the first viewport; the portion of the plurality of the first-level image tiles having been (i) downloaded by the client device from the server and (ii) stored by the client device in the memory to enable rendering thereof; the processor being configured to execute the method of any one of clauses 1 to 13.

Lower Zoom Level Downloading Process

From a certain perspective, embodiments of the present technology can be summarized as follows, structured in numbered clauses:

CLAUSE 1. A method (900) of downloading image tiles (210) onto a client device (102), the client device having an output device and being connectable to a sever (112) via a communication network (108), the server storing a plurality of image tiles organized in a hierarchical structure (300), each level (302, 304, 306, 308) of the hierarchical structure storing a sub-set of the plurality of image tiles being associated with a particular resolution level, the method executable at the client device, the method comprising:

receiving (902) a request for an image view (206), the image view being associated with a first viewport (220, 604) and a first resolution level;

transmitting (904), to the server, a first request (160, 164) for a first set of image tiles, the first set of image tiles for enabling the client device to display a requested image view on the output device, the first set of image tiles being part of a plurality of image ties of the first resolution level;

the first request being further configured to cause the server to prepare a second set of image tiles (702), the second set of image tiles for enabling the client device to display a different image view, which is:

associated with a second viewport at least partially overlapping with the first viewport; and having a second resolution level being lower than the first resolution level;

each given image tile (1004) of the second set of image tiles having four child image tiles (1002) in the plurality of image tiles of the first resolution level as prescribed by the hierarchical structure;

receiving (906), from the server:

the first set of image tiles;

the second set of image tiles, the second set of image tiles excluding a subset of second set of image tiles each one of the subset of second set having all four child image tiles in the first set of image tiles;

receiving (908) a request to change the first viewport (704) to a third viewport (606);

rendering and displaying a transition view (910), the transition view made up of the second set of image tiles and the respective child image tiles in lieu of the subset of second set of image tiles;

transmitting (912), to the server, a third request (160, 164) for a map tiles native to the third viewport required for displaying the third viewport;

rendering (914) the third viewport using the map tiles native to the third viewport;

replacing (916) the transition view with the third viewport.

CLAUSE 2. The method of clause 1, wherein the transmitting the first request is executed before the receiving the request to change the first viewport to the second viewport.

CLAUSE 3. The method of any one of clauses 1 or 2, wherein the transition view is displayed while executing the transmitting the third request and the rendering the different image view.

CLAUSE 4. The method of any one of clauses 1 to 3, the first request being further configured to cause the server to prepare:

a third set of image tiles, the third set of image tiles for enabling the client device to display a further image view, the further image view being associated with a fourth viewport at least partially overlapping with the first viewport and the second viewport; and having a third resolution level being lower than the first resolution level and the second resolution level;

the third set of image tiles being part of a plurality of image tiles of the third resolution level;

each given image tile of the third set of image tiles having four child image tiles in the plurality of image tiles of the second resolution level as prescribed by the hierarchical structure;

and wherein the receiving, from the server further comprises receiving the third set of image tiles, the third set of image tiles excluding a subset of third set of image tiles each one of the subset of third set of image tiles having all four child image tiles in the second set of image tiles;

in response to the request to change the first viewport to the further image view:

rendering and displaying another transition view, the other transition view made up of the third set of image tiles and the respective child image tiles in lieu of the subset of third set of image tiles;

transmitting, to the server, a fourth request for a map tiles native to the fourth viewport required for displaying the fourth viewport;

rendering another transition view, the other transition view made up of the third set of image tiles and the respective child image tiles in lieu of the subset of third set of image tiles;

transmitting, to the server, a fourth request for a complete fourth set of image tiles;

rendering the further image view using the complete fourth set of image tiles;

replacing the other transition view with the further image view.

CLAUSE 5. The method of clause 4, further comprising, in response to the request to change the first viewport to the further image view, ceasing executing one of:

transmitting, to the server, a third request for a complete second set of image tiles;

rendering the different image view using the complete second set of image tiles;

replacing the transition view with the different image view, which execution has not yet completed.

CLAUSE 6. The method of any one of clauses 1 to 5, wherein the hierarchical structure is a quad tree data structure.

CLAUSE 7. The method of any one of clauses 1 to 6, wherein the image tiles comprise map tiles and the resolution level parameter comprises a zoom level.

CLAUSE 7. The method of any one of clauses 1 to 6, wherein the image tiles comprise game textures and the resolution level parameter comprises a detailing level.

CLAUSE 9. An electronic device (102) comprising:

a processor;

an output device for displaying at least one image;

a communication interface for communicating to a sever (112) via a communication network (108), the server storing a plurality of image tiles (210) organized in a hierarchical structure (300), each level of the hierarchical structure (302 304, 306, 308) storing a sub-set of the plurality of image tiles being associated with a particular resolution level, the processor being configured to execute the method of any one of clauses 1 to 8.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for downloading image tile data from a server to a client device, the image tile data being organized, by the server, in a hierarchal structure, where each level of the hierarchal structure stores a subset of image tiles associated with a particular resolution level;

the client device including a memory and an output device, the client device being connectable to the server via a communication network, the output device displaying a first image view, the first image view being associated with a first viewport and a first resolution level, the first image view being generated using a portion of the plurality of the first-level image tiles associated with the first resolution level, the portion being determined by the first viewport;

the portion of the plurality of the first-level image tiles having been (i) downloaded by the client device from the server and (ii) stored by the client device in the memory to enable rendering thereof;

the method being executable by the server;

the method comprising:

receiving, from the client device, a request for a plurality of second-level image tiles to replace the plurality of first-level image tiles to display a second image view, the second image view being associated with a second view port and a second resolution level, the second resolution level being larger than the first resolution level; each image tile of the plurality of first-level image tiles having four child second-level image tiles within the plurality of second-level image tiles as defined by the hierarchal structure;

determining an anchor point of the first image view;

based on the anchor point, determining a first anchor image tile of the first-level image tiles;

using the hierarchical structure, determining a corresponding four child second-level image tiles, the corresponding four-child second-level image tiles forming a second anchor image tile;

sending to the client device the second anchor image tile, the sending configured to cause the client device to:

replace, in the memory, the first anchor image tile with the second anchor image tile;

replace, on the output device, the first anchor image tile with the second anchor image tile.

2. The method of claim 1, further comprising, after the sending to the client device the second anchor image tile:

determining a first adjacent image tile of the first-level image tiles, the first adjacent image tile being adjacent to the first anchor image tile of the first-level image tiles;

using the hierarchical structure, determining a corresponding four child second-level image tiles for the first adjacent image tile, the corresponding four-child second-level image tiles forming a second adjacent image tile;

sending to the client device the second adjacent image tile, the sending configured to cause the client device to:

replace, in the memory, the first adjacent image tile with the second adjacent image tile;

replace, on the output device, the first adjacent image tile with the second adjacent image tile.

3. The method of claim 2, further comprising, after the sending to the client device the second adjacent image tile:

determining a third adjacent image tile of the first-level image tiles, the third adjacent image tile being adjacent to the first anchor image tile of the first-level image tiles;

using the hierarchical structure, determining a corresponding four child second-level image tiles for the third adjacent image tile, the corresponding four-child second-level image tiles forming a fourth adjacent image tile;

sending to the client device the fourth adjacent image tile, the sending configured to cause the client device to:

replace, in the memory, the third adjacent image tile with the fourth adjacent image tile;

replace, on the output device, the third adjacent image tile with the fourth adjacent image tile.

4. The method of claim 1, wherein the determining the anchor point of the first image view comprises receiving an indication of the anchor point from the client device.

5. The method of claim 4, wherein the indication of the anchor point corresponds to a center-point of the first viewport.

6. The method of claim 4, wherein the indication of the anchor point corresponds to a cursor position over the first viewport.

7. The method of claim 1, wherein the hierarchical structure is a quad tree data structure.

8. The method of claim 1, wherein the image tiles comprise map tiles and the resolution level comprises a zoom level.

9. The method of claim 1, wherein the image tiles comprise game textures and the resolution level comprises a detailing level.

10. The method of claim 1, wherein the sending to the client device the second anchor image tile further comprises sending an instruction, the instruction to cause the client device to:

replace, in the memory, the first anchor image tile with the second anchor image tile;

replace, on the output device, the first anchor image tile with the second anchor image tile.

11. The method of claim 1, wherein the sending to the client device the second anchor image causes the client device to:

replace, in the memory, the first anchor image tile with the second anchor image tile;

replace, on the output device, the first anchor image tile with the second anchor image tile;

the steps of replacing being executed based on computer-executable instructions stored by the client device.

12. The method of claim 1, wherein the memory comprises a cache memory.

13. The method of claim 1, wherein the sending to the client device the second anchor image tile is further configured to cause the client device to:

render the second anchor image tile.

14. A server comprising:

a processor;

a memory storage coupled to the processor, the memory storage for storing image tile data; the image tile data being organized, by the server, in a hierarchal structure, where each level of the hierarchal structure stores a subset of image tiles associated with a particular resolution level;

a communication interface for allowing the server be connectable to a client device via a communication network, the client device including a memory and an output device, the output device displaying a first image view, the first image view being associated with a first viewport and a first resolution level, the first image view being generated using a portion of the plurality of the first-level image tiles associated with the first resolution level, the portion being determined by the first viewport;

the portion of the plurality of the first-level image tiles having been (i) downloaded by the client device from the server and (ii) stored by the client device in the memory to enable rendering thereof;

the processor being configured to:
  receive, from the client device, a request for a plurality of second-level image tiles to replace the plurality of first-level image tiles to display a second image view, the second image view being associated with a second view port and a second resolution level, the second resolution level being larger than the first resolution level; each image tile of the plurality of first-level image tiles having four child second-level image tiles within the plurality of second-level image tiles as defined by the hierarchal structure;
  determine an anchor point of the first image view;
  based on the anchor point, determine a first anchor image tile of the first-level image tiles;
  using the hierarchical structure, determine a corresponding four child second-level image tiles, the corresponding four-child second-level image tiles forming a second anchor image tile;
  send to the client device the second anchor image tile, the sending configured to cause the client device to:
    replace, in the memory, the first anchor image tile with the second anchor image tile;
    replace, on the output device, the first anchor image tile with the second anchor image tile.

15. The server of claim 14, the processor being further configured, after the sending to the client device the second anchor image tile, to:
  determine a first adjacent image tile of the first-level image tiles, the first adjacent image tile being adjacent to the first anchor image tile of the first-level image tiles;
  using the hierarchical structure, determine a corresponding four child second-level image tiles for the first adjacent image tile, the corresponding four-child second-level image tiles forming a second adjacent image tile;
  send to the client device the second adjacent image tile, the sending configured to cause the client device to:
    replace, in the memory, the first adjacent image tile with the second adjacent image tile;
    replace, on the output device, the first adjacent image tile with the second adjacent image tile.

16. The server of claim 15, the processor being further configured, after the sending to the client device the second adjacent image tile, to:
  determine a third adjacent image tile of the first-level image tiles, the third adjacent image tile being adjacent to the first anchor image tile of the first-level image tiles;
  using the hierarchical structure, determine a corresponding four child second-level image tiles for the third adjacent image tile, the corresponding four-child second-level image tiles forming a fourth adjacent image tile;
  send to the client device the fourth adjacent image tile, the sending configured to cause the client device to:
    replace, in the memory, the third adjacent image tile with the fourth adjacent image tile;
    replace, on the output device, the third adjacent image tile with the fourth adjacent image tile.

17. The server of claim 14, wherein to determine the anchor point of the first image view, the processor is configured to receive an indication of the anchor point from the client device.

18. The server of claim 17, wherein the indication of the anchor point corresponds to a center-point of the first viewport.

19. The server of claim 17, wherein the indication of the anchor point corresponds to a cursor position over the first viewport.

20. The server of claim 14, wherein the hierarchical structure is a quad tree data structure.

* * * * *